US007822594B2

(12) United States Patent
Haviv et al.

(10) Patent No.: US 7,822,594 B2
(45) Date of Patent: Oct. 26, 2010

(54) SERVICE-ORIENTED INFRASTRUCTURE MANAGEMENT

(75) Inventors: Yaron Haviv, Tel Mond (IL); Albert Berlovitch, Petah Tikva (IL)

(73) Assignee: Voltaire Ltd., Ra'anana (IL)

( * ) Notice: Subject to any disclaimer, the term of this patent is extended or adjusted under 35 U.S.C. 154(b) by 262 days.

(21) Appl. No.: 11/635,119

(22) Filed: Dec. 6, 2006

(65) Prior Publication Data

US 2008/0123559 A1     May 29, 2008

Related U.S. Application Data

(60) Provisional application No. 60/821,579, filed on Aug. 7, 2006, provisional application No. 60/821,580, filed on Aug. 7, 2006.

(51) Int. Cl.
*G06F 9/44* (2006.01)
*G06F 3/00* (2006.01)
(52) U.S. Cl. ............................................. 703/21; 710/8
(58) Field of Classification Search .................. 703/21; 370/254–255; 710/8, 9
See application file for complete search history.

(56) References Cited

U.S. PATENT DOCUMENTS

| | | | |
|---|---|---|---|
| 5,991,299 A | 11/1999 | Radogna et al. | |
| 6,061,349 A | 5/2000 | Coile et al. | |
| 6,366,558 B1 | 4/2002 | Howes et al. | |
| 6,421,711 B1 | 7/2002 | Blumenau et al. | |
| 6,445,704 B1 | 9/2002 | Howes et al. | |
| 6,587,469 B1 | 7/2003 | Bragg | |
| 6,789,054 B1 * | 9/2004 | Makhlouf | 703/6 |
| 6,789,118 B1 | 9/2004 | Rao | |
| 7,016,060 B1 * | 3/2006 | Carney et al. | 358/1.15 |
| 7,181,302 B2 * | 2/2007 | Bayne | 700/96 |
| 2002/0021701 A1 | 2/2002 | Lavian et al. | |
| 2004/0252722 A1 | 12/2004 | Wybenga et al. | |
| 2005/0120160 A1 * | 6/2005 | Plouffe et al. | 711/1 |
| 2006/0156059 A1 * | 7/2006 | Kitamura | 714/6 |
| 2006/0165040 A1 * | 7/2006 | Rathod et al. | 370/335 |
| 2006/0221961 A1 * | 10/2006 | Basso et al. | 370/390 |
| 2006/0242288 A1 * | 10/2006 | Masurkar | 709/223 |
| 2007/0140266 A1 | 6/2007 | Njoku et al. | |

OTHER PUBLICATIONS

Lassere et al., "Virtual Private LAN Service (VPLS) Using Label Distribution Protocol (LDP) Signaling", Network Working Group, RFC4762, Jan. 2007.

(Continued)

*Primary Examiner*—Paul L Rodriguez
*Assistant Examiner*—Andre Pierre Louis
(74) *Attorney, Agent, or Firm*—Fish & Richardson P.C.

(57) ABSTRACT

A method for computing includes specifying a data processing system using a logical system definition, which defines logical system components having respective functionalities and a topology for interconnecting the logical system components. The logical system components are represented using respective logical objects in a hierarchical object model. Physical resources of a grid computer system are represented using physical objects in the hierarchical object model. The logical objects are automatically mapped to at least some of the physical objects, so as to allocate the physical resources to carry out the respective functionalities of the logical system components. The allocated physical resources are configured and activated so as to cause the grid computer system to function as the data processing system, in accordance with the logical system definition.

81 Claims, 10 Drawing Sheets

OTHER PUBLICATIONS

IBM Software, Tivoli Solutions: Orchestration and Provisioning Management, Mar. 13, 2006 http://web.archive.org/web/20061017093540/www-306.ibm.com/software/tivoli/solutions/orchestration-provisioning-management/.

"Enterprise Grid Computing: Overview", Enterprise Grid Alliance, Jan. 2006.

Ishihara et al., "Carrier-Grade Ethernet Switch for Reliable Wide-Area Ethernet Service", Fujitsu Science Technology Journal, vol. 39, No. 2, pp. 234-243, Dec. 2003.

Pelissier et al., "Thoughts on Network Interface Virtualization", Sep. 2008.

Ganga et al., "Virtual Ethernet Bridging in Server End Stations", IEEE 802.1 Interim Meeting, Seoul, Korea, Sep. 16, 2008.

Ghanwani et al., "Bridge Requirements for Server Virtualization", Sep. 2008.

Ko et al., "Virtual Ethernet Bridging", IBM, Jul. 16, 2008.

International Application PCT/IL2007/000867 Search Report dated Sep. 23, 2008.

Nortel, Application Brief: Dynamic Resource Allocation Controller (DRAC), Nortel Networks, 2006.

Travostino et al., "Project DRAC: Creating an Applications-Aware Network", Supercomputing 2004, Pittsburgh, USA, Nov. 6-12, 2004.

Hewlerd Packard Inc., "New HP OpenView Software Enables CIOs to Run IT as a Business", HP News Release, Miami, USA, Jun. 20, 2006 (http://www.hp.com/hpinfo/newsroom/press/2006/060620a.html).

Cisco Systems Inc., "Cisco VFrame—Frequently Asked Questions", 1992-2006.

DMTF, CIM System Model White Paper, CIM Version 2.7, Document version 1.0, Jun. 10, 2003.

DMTF, CIM Device Model White Paper, CIM Version 2.7, version 0.9, Jun. 19, 2003.

Haviv et al., U.S. Appl. No. 12/344,235 "Virtual Input-Output Connections for Machine Virtualization" filed Dec. 25, 2008.

\* cited by examiner

SERVICE-ORIENTED INFRASTRUCTURE MANAGEMENT

CROSS-REFERENCE TO RELATED APPLICATIONS

This application claims the benefit of U.S. Provisional Patent Application 60/821,579 and U.S. Provisional Patent Application 60/821,580, both filed Aug. 7, 2006, which are incorporated herein by reference.

FIELD OF THE INVENTION

The present invention relates generally to data processing systems, and particularly to methods and systems for configuring and operating data processing systems over computer grids.

BACKGROUND OF THE INVENTION

Grid computing is a model that uses multiple interconnected computers to perform high-throughput computing. The grid typically comprises elements such as servers and storage devices, which are interconnected by a high-capacity network. In some cases, a virtual computing system architecture is modeled over the grid of networked computers. Grid computing architectures are sometimes used by enterprises to implement computing systems, such as data centers. Information on enterprise applications of grid computing can be found, for example, at www.gridalliance.org/en/resources.

Several methods and systems for configuring and managing enterprise grid applications are known in the art. For example, Cisco Systems, Inc. (San Jose, Calif.) offers a data center provisioning and orchestration software tool called VFrame. VFrame enables an administrator to commission and decommission shared pools of server and input/output (I/O) resources on demand. The software creates virtual "compute services" by programming server switches to map diskless servers to a shared pool of I/O and storage resources. Additional details regarding this product are available at www.cisco.com/en/US/products/ps6429.

As another example, Nortel Networks, Inc. (Brampton, Ontario, Canada) developed proof-of-concept middleware called Dynamic Resource Allocation Controller (DRAC), for allocating network resources in grid networks. DRAC comprises a policy engine that enables applications to secure necessary network resources. Additional details regarding DRAC are available at www.nortel.com/solutions/optical/collateral/nn110181.pdf.

Computer systems are sometimes represented using information models. For example, the common information model (CIM), developed by the Distributed Management Task Force (DMTF), is an object-oriented information model used for describing computing and business entities in Internet, enterprise and service provider environments. Further details regarding CIM are available at www.dmtf.org.

SUMMARY OF THE INVENTION

There is therefore provided, in accordance with an embodiment of the present invention, a method for computing, including:

specifying a data processing system using a logical system definition, which defines logical system components having respective functionalities and a topology for interconnecting the logical system components;

representing the logical system components using respective logical objects in a hierarchical object model;

representing physical resources of a grid computer system using physical objects in the hierarchical object model;

automatically mapping the logical objects to at least some of the physical objects, so as to allocate the physical resources to carry out the respective functionalities of the logical system components; and configuring and activating the allocated physical resources so as to cause the grid computer system to function as the data processing system, in accordance with the logical system definition.

In some embodiments, the logical system components include at least one component selected from a group of components consisting of logical servers, logical storage devices and logical networks. The logical objects typically include hierarchical objects including at least one class selected from a group of classes consisting of a root class, an environment class, a users class, a logical server class, a compute node class, an image class, an attribute class, a service class, an interface class and a logical disk class.

In a disclosed embodiment, specifying the data processing system includes specifying a service running on one or more of the logical system components, and configuring and activating the allocated physical resources includes configuring and activating the service on the allocated physical resources.

In another embodiment, the physical resources include at least one component selected from a group of components consisting of physical servers, virtual servers, physical storage devices, virtual storage devices and communication networks. Typically, the physical objects include hierarchical objects including at least one class selected from a group of classes consisting of a root class, a site class, a users class, a system group class, a system class, an attribute class, a module class, an extent class and a port class. The system class may include at least one subclass selected from a group of subclasses consisting of a field replaceable unit (FRU) subclass, a group subclass, a switch/router subclass, a computer subclass and a storage device subclass.

In yet another embodiment, specifying the data processing system includes specifying two or more logical servers, specifying logical network connections that interconnect the logical servers so as to implement the specified topology, and specifying logical storage devices to be used by the logical servers.

In still another embodiment, representing the physical resources includes automatically identifying the physical resources in the grid computer system and learning attributes of the identified physical resources.

In an embodiment, representing the logical system components and physical resources includes arranging the logical and physical objects in multiple levels of hierarchy in the object model, and automatically mapping the logical objects to the physical objects includes pointing from the logical objects to the corresponding physical objects at the multiple levels of the hierarchy.

In some embodiments, one of the logical system components includes a logical network interface connection (NIC), one of the physical resources allocated to the one of the logical system components includes a physical port, and pointing from the logical objects to the corresponding physical objects includes pointing from a logical object representing the virtual NIC to a physical object representing the physical port.

In some embodiments, the method includes adaptively re-allocating the physical resources during operation of the grid computer system. Adaptively re-allocating the physical resources may include detecting a configuration change in the grid computer system, and re-allocating the physical resources so as to continue carrying out the functionalities of the logical system components following the configuration change.

Additionally or alternatively, specifying the data processing system includes specifying a performance level of at least one of the logical system components, and adaptively re-allocating the physical resources includes detecting a deviation from the specified performance level and re-allocating the physical resources so as to correct the deviation. Further additionally or alternatively, adaptively re-allocating the physical resources includes accepting a modification of the logical system definition and re-allocating the physical resources responsively to the modified logical system definition.

In an embodiment, specifying the data processing system includes defining two or more alternative logical system definitions, mapping the logical objects to the physical objects includes determining two or more alternative allocations of the physical resources corresponding to the respective logical system definitions, and configuring and activating the physical resources includes alternating between the two or more alternative allocations. Alternating between the two or more alternative allocations may include alternating between the allocations in accordance with a predefined time schedule.

In another embodiment, the method includes evaluating an equivalent status of a logical system component by detecting a resource status of the physical resources that are allocated to carry out the functionality of the logical system component, and converting the resource status to the equivalent status of the logical system component. In yet another embodiment, evaluating the equivalent status includes performing at least one action selected from a group of actions consisting of declaring a virtual failure in the logical system component, detecting a deviation from a performance level specified for the logical system component, reporting the equivalent status to a user and reporting the equivalent status to an external application.

In still another embodiment, specifying the data processing system includes accepting the logical system definition from one of a user and an external application.

There is additionally provided, in accordance with an embodiment of the present invention, a computing apparatus, including:

an interface, which is operative to communicate with a grid computer system; and a processor, which is arranged to accept a specification of a data processing system using a logical system definition, which defines logical system components having respective functionalities and a topology for interconnecting the logical system components, to represent the logical system components using respective logical objects in a hierarchical object model, to represent physical resources of the grid computer system using physical objects in the hierarchical object model, to automatically map the logical objects to at least some of the physical objects, so as to allocate the physical resources to carry out the respective functionalities of the logical system components, and to configure and activate the allocated physical resources so as to cause the grid computer system to function as the data processing system, in accordance with the logical system definition.

In an embodiment, the processor is arranged to store the hierarchical object model in a relational database.

The apparatus may include a user terminal, which is arranged to interact with a user so as to enable the user to construct and enter the logical system definition. In some embodiments, the user terminal is arranged to interact with the user using at least one interface type selected from a group of types consisting of a graphical user interface (GUI) and a command line interface (CLI). Additionally or alternatively, the apparatus includes an application interface, which is connected to the processor and is arranged to accept the logical system definition from an external application.

There is further provided, in accordance with an embodiment of the present invention, a computing system, including:

a grid computer system including physical resources; and an infrastructure management (IM) server, which is arranged to accept a specification of a data processing system using a logical system definition, which defines logical system components having respective functionalities and a topology for interconnecting the logical system components, to represent the logical system components using respective logical objects in a hierarchical object model, to represent the physical resources of the grid computer system using physical objects in the hierarchical object model, to automatically map the logical objects to at least some of the physical objects, so as to allocate the physical resources to carry out the respective functionalities of the logical system components, and to configure and activate the allocated physical resources so as to cause the grid computer system to function as the data processing system, in accordance with the logical system definition.

In some embodiments, the communication network includes a remote direct memory access (RDMA)-capable network.

There is also provided, in accordance with an embodiment of the present invention, a computer software product for controlling a grid computer system, the product including a computer-readable medium, in which program instructions are stored, which instructions, when read by a computer, cause the computer to accept a specification of a data processing system using a logical system definition, which defines logical system components having respective functionalities and a topology for interconnecting the logical system components, to represent the logical system components using respective logical objects in a hierarchical object model, to represent physical resources of the grid computer system using physical objects in the hierarchical object model, to automatically map the logical objects to at least some of the physical objects, so as to allocate the physical resources to carry out the respective functionalities of the logical system components, and to configure and activate the allocated physical resources so as to cause the grid computer system to function as the data processing system, in accordance with the logical system definition.

The present invention will be more fully understood from the following detailed description of the embodiments thereof, taken together with the drawings in which:

DETAILED DESCRIPTION OF EMBODIMENTS

Overview

Figure 1:
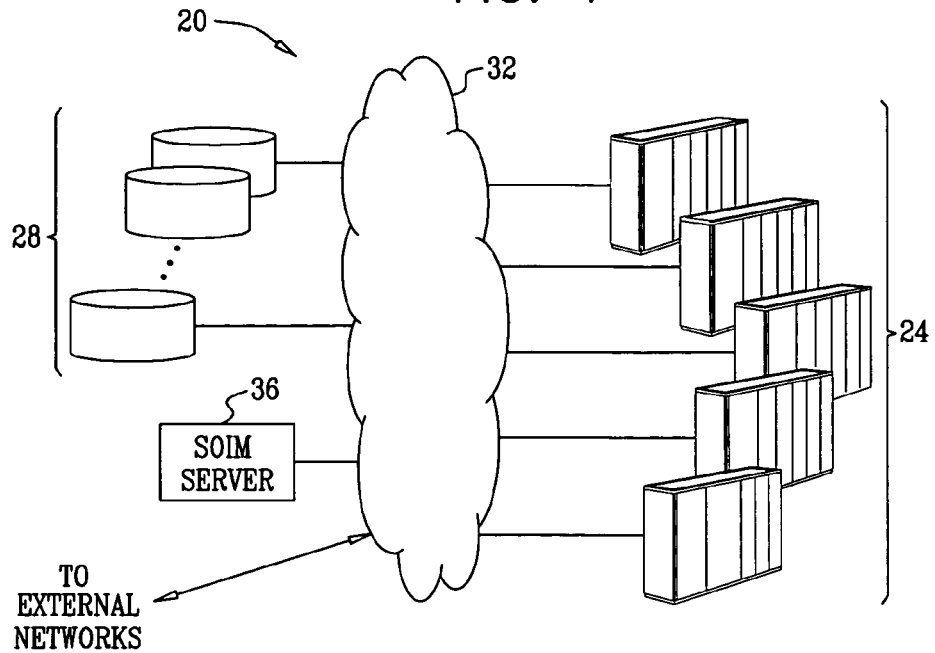
FIG. 1 is a block diagram that schematically illustrates a computer grid system, in accordance with an embodiment of the present invention.

Embodiments of the present invention provide methods and systems for automatically configuring, monitoring and adapting a computer grid to operate as a data processing system, such as an enterprise data center.

A user, such as a system designer or administrator, or alternatively an external automation tool, specifies a logical system definition of the data center. The logical system definition comprises an abstract, functional definition, which specifies the data center in terms of the desired services, topology, connectivity, functionality and performance objectives, irrespective of the physical properties, underlying technology and/or geographical locations of the different physical components of the grid. In many cases, the user is not aware of the structure, performance, technology and geography of the grid (although he or she can query these properties if desired). Moreover, grid components may be added, removed or modified as a result of failures or upgrades. These grid modifications are transparent to the user and to the logical system definition.

A service-oriented infrastructure management (SOIM) server, which is connected to the grid, automatically identifies and learns the physical resources of the grid, such as the different physical components and their attributes. The SOIM server converts the logical system definition and the identified physical resources into a hierarchical object model. The object model comprises physical objects, which model the physical grid components, and logical objects, which model the objects of the logical system definition.

The SOIM server allocates physical components to the different logical objects. In other words, the SOIM server automatically allocates physical grid resources, such as servers, storage devices and network connections, to perform the functions of the logical objects specified by the user. The SOIM server then configures and provisions the allocated physical components, and deploys the appropriate applications and services. At this stage, the grid operates as a virtual data center, in accordance with the requirements of the logical system definition.

During operation of the data center, the SOIM server monitors the grid and re-configures its components when appropriate. Grid re-configuration is triggered, for example, when physical components are added or removed due to failure or upgrade. The grid can also be automatically re-configured when a performance metric or service level specified by the user is not met.

In some cases, the logical system definition can vary over time. For example, the user may modify the data center topology, add new requirements or otherwise modify the logical system definition. Additionally or alternatively, the logical system definition may specify that the data center alternate between two or more preset configurations at scheduled times or dates. Whenever a change of configuration is triggered, the SOIM server adapts the object model and performs the corresponding re-configuration of physical components.

The SOIM server provides performance, status and failure information to the user. Since the user is usually aware only of the logical structure of the data center and not of the physical structure of the grid, the SOIM server translates component-level performance, status and failure information into information that is associated with logical objects, as they are known to the user. The SOIM server may also evaluate performance metrics and statistics associated with a particular logical object, based on monitored performance of the corresponding physical components.

The methods and systems described herein enable flexible, quick and efficient data center configuration and operation, even though the data center may comprise a wide variety of physical components of different brands and vendors, conforming to different technologies and distributed over different geographical locations.

The methods and systems described herein provide an abstract, logical view of the system towards the user and/or towards external automated management tools. The separation between the physical grid resources and the logical requirements enables smooth and fault-tolerant operation, in which the specified service quality and performance are continuously monitored and met. As a result, the physical resources needed to meet the specified service levels and objectives of the data center can be reduced.

System Description

FIG. 1 is a block diagram that schematically illustrates a computer grid system 20, in accordance with an embodiment of the present invention. Grid 20 comprises compute nodes 24 and storage devices 28, which are interconnected by a communication network 32.

Compute nodes 24 may comprise, for example, servers, switches, routers, personal computers, workstations or any other suitable computing platform. Storage devices 28 may comprise, for example, disks, tapes or any other suitable storage media or device.

Communication network 32 may comprise any suitable data network or combination of networks. In some embodiments, network 32 comprises a network that is capable of remote direct memory access (RDMA), such as an Infiniband® network or a Gigabit-Ethernet (GbE) network. Information regarding Infiniband networks is available, for example, at www.infinibandta.org/itinfo. Network 32 may alternatively comprise any other suitable network type.

Compute nodes 24 and storage devices 28 may be collocated in a single site, such as in a single rack or chassis, or distributed over different geographical locations, as desired. In the latter case, communication network 32 may comprise a wide area network (WAN), such as the Internet. Network 32 may comprise one or more local area networks (LANs) and/or storage area networks (SANs). The grid network can also be connected to one or more external networks, such as the Internet.

The compute nodes, storage devices and interconnecting networks of grid 20 may use different technologies, operating systems and interfaces. The different components may be provided by different vendors and installed at different locations. Communication with storage devices 28 may be implemented using any suitable standard or protocol, such as the Small Computer Systems Interface (SCSI), Internet-SCSI (iSCSI), Fibre-Channel (FC) or InfiniBand (IB) protocols, for example.

Grid 20 may comprise one or more application environments. An Application Environment may comprise one or more virtual servers and provide on or more services. A virtual server comprises a virtual computing instance, which uses the resources of one or more of physical servers 24. For example, a virtual server may use only part of the computational resources of a server 24, or it may alternatively use the combined resources of multiple physical servers. A virtual server can be used as a resource for running a particular service.

Additionally or alternatively, grid 20 may comprise one or more virtual storage objects. A virtual storage object is a logical storage entity, which may use only part of the storage resources of a certain physical storage device 28, or the combined storage resources of multiple physical storage devices. When a virtual server or storage resource is based on the combined resources of multiple physical components, these components may be either collocated or distributed in different locations. The physical and virtual servers and storage devices and the different networks in grid 20 are collectively referred to herein as components.

Grid 20 may also comprise one or more logical network objects. Logical networks may comprise, for example, global networks that serve the entire grid and/or local networks that are associated with a particular application environment. Other logical networks may comprise or internal networks, for clustering the objects of a particular logical server. Several examples and definitions of logical network objects are described below.

Object Model-Based Grid Configuration

Grid 20 is configured and operated as a data processing computing system, also commonly referred to as a data center. The examples described herein mainly refer to operation of grid 20 as hosting multiple data centers that serve a particular enterprise. Alternatively, grid 20 can be configured and operated as a public resource pool allowing multiple data centers that serve multiple enterprises, or as any other computing system, as desired.

For example, in some applications, a single system can be partitioned into multiple isolated logical systems for security/isolation reasons. In such cases, each logical system typically runs a different application with a different security classification. As another example, a computing system of a test laboratory may be configured to have multiple logical environments having different configurations and test conditions. Environments can then be turned on and off, as needed for different testing requirements. Such a flexible configuration significantly improves the utilization efficiency of test equipment.

The enterprise that operates grid 20 usually specifies the requirements of its data center in terms of the desired business services, business flows, topology, connectivity, functionality and performance objectives. From the enterprise's point of view, the data center definition is a logical definition, which is specified irrespective of the physical properties, underlying technology and/or geographical locations of the different grid components. In many cases, the user who specifies the data center requirements is not aware of the structure, performance, technology and geography of the grid. Moreover, grid components may be added, removed or modified as a result of failures or upgrades. These grid modifications are transparent to the logical system definition.

In some cases, the logical data center requirements vary over time. For example, a data center of a bank or other financial organization may dedicate more resources to on-line financial transactions during normal business hours. At night or during the weekend, the same data center may perform a smaller volume of on-line transactions, and dedicate most of its resources to batch transactions processing, off-line database updates and other off-line and housekeeping tasks. Yet a different resource allocation may be preferred on special dates, such as at the beginning or end of the month.

The different sets of logical requirements may differ from one another in the amount of resources allocated to each task, and also in the overall topology of the data center. Alternation among the different preset configurations may occur at scheduled times, or in response to an explicit request from the user.

Embodiments of the present invention provide methods and systems for automatically configuring and operating grid system 20 to match a given logical system definition. Grid 20 comprises a service-oriented infrastructure management (SOIM) server 36, which carries out the methods described herein.

Figure 2:
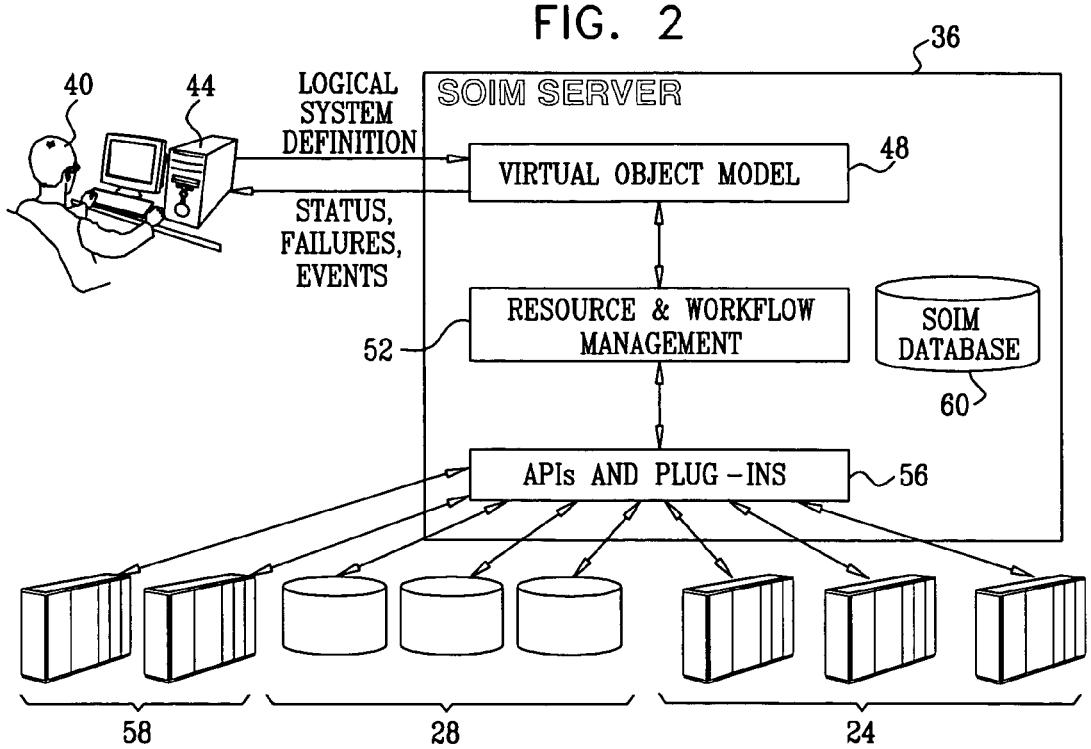
FIG. 2 is a block diagram that schematically illustrates a service-oriented infrastructure management (SOIM) server, in accordance with an embodiment of the present invention.

FIG. 2 is a block diagram that schematically illustrates elements of SOIM server 36, in accordance with an embodiment of the present invention. Server 36 accepts a logical system definition from a user 40, typically a system designer or administrator, via a user terminal 44. The SOIM server constructs an object model 48 of the data center, based on the logical definition provided by the user and on the physical resources of the grid.

A resource and workflow management module 52 maps the objects and relationships of the object model to available physical and/or virtual computing, storage and network resources of grid 20. Server 36 interacts with the different grid components using application program interfaces (APIs) and plug-ins 56. Some of these components may also comprise switches/routers 58. The SOIM server can interact with the different grid components using any suitable standard or protocol, such as the well-known Simple Network Management Protocol (SNMP), using the Component Information Model (CIM) cited above, or using a command line interface (CLI) or web services (WS) interface.

The logical system definition, object model data, system component attributes and other information model definitions are stored in a SOIM database 60.

Typically, SOIM server 36 comprises a general-purpose computer, which is programmed in software to carry out the functions described herein. The software may be downloaded to the computer in electronic form, over a network, for example, or it may alternatively be supplied to the computer on tangible media, such as CD-ROM.

Object model 48 comprises a hierarchical, object-oriented model of the specified data center. The model comprises objects that represent both the physical components of grid 20, and the logical objects specified by the user. Both physical and logical objects in model 48 are defined in accordance with predefined object classes. Exemplary class definitions and objects are described in FIGS. 8A-8C, 9, 10A and 10B further below.

In some embodiments, object model 48 is implemented using a relational database system. In these embodiments, tables that represent objects and relationships between objects, as well as any other data of model 48, are stored in SOIM database 60. Alternatively, model 48 can be implemented using any other suitable data structure.

Configuring and Operating a Virtual Data Center

Figure 3:
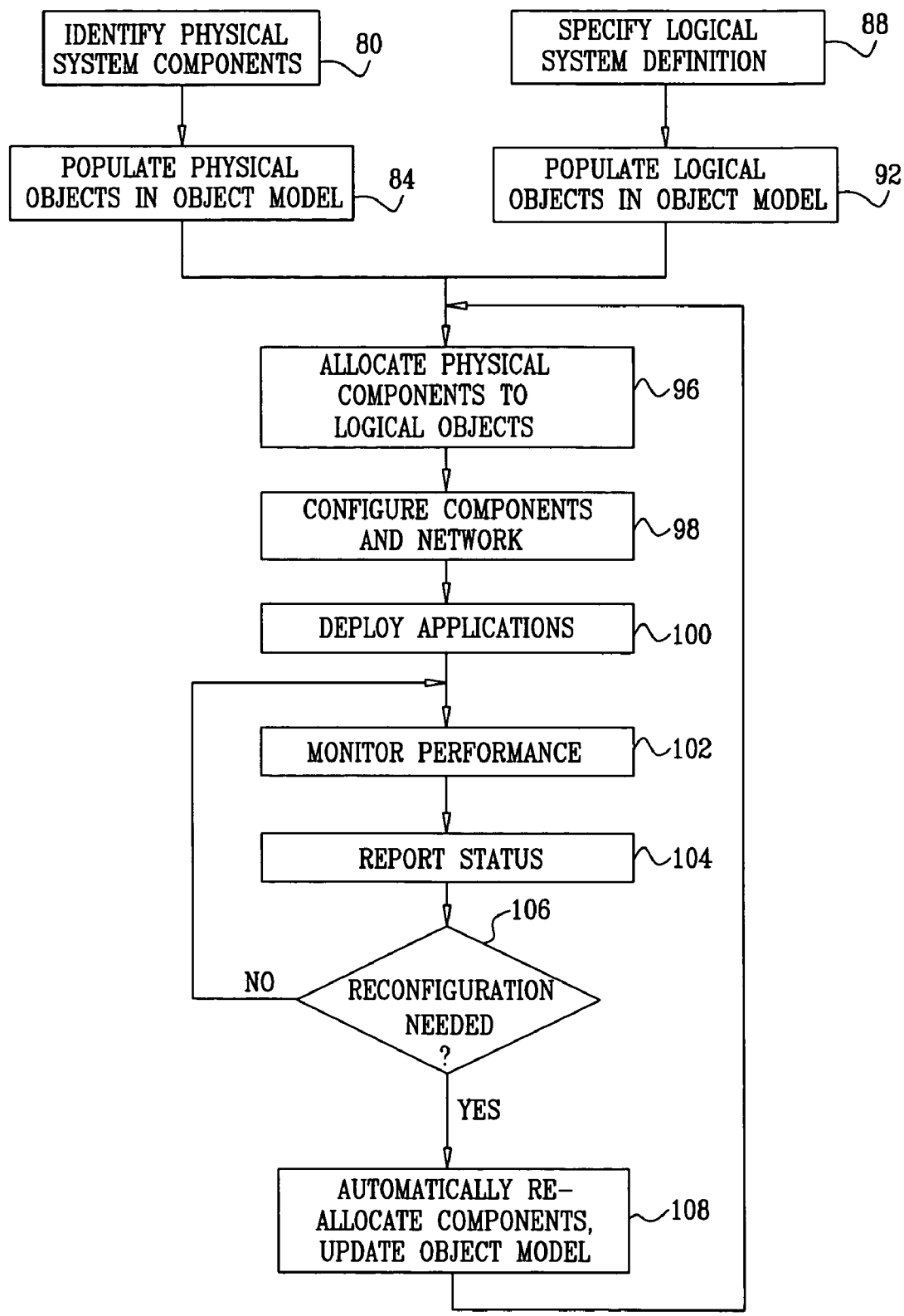
FIG. 3 is a flow chart that schematically illustrates a method for configuring and operating a virtual data center over a computer grid, in accordance with an embodiment of the present invention.

FIG. 3 is a flow chart that schematically illustrates a method for configuring and operating a virtual data center over a grid network, in accordance with an embodiment of the present invention. The method can be viewed as being divided into two stages. In the initialization stage, SOIM server 36 automatically learns the available physical resources, accepts a logical system definition from a user or from an external tool or application, and constructs object model 48. The SOIM server then allocates physical resources to the logical objects, configures and provisions the physical components of the grid, and activates the different applications. At this stage, the grid is configured and operational, in accordance with the logical system definition.

In the operational stage, the SOIM server monitors the performance of the grid and reacts to changing conditions and requirements. For example, the SOIM server provides performance, status and failure reports to the user, after associating them with the appropriate logical object. When a change in the physical components occurs, such as following a failure, a component replacement or upgrade, the SOIM server modifies the object model and re-allocates physical components to logical objects accordingly. The SOIM server can also modify the object model and re-allocate physical resources in response to changes in the logical system definition during the operational stage.

The method begins with SOIM server 36 identifying the physical components of the grid, at a component identification step 80. The SOIM server communicates with the different grid components via APIs 56 over network 32, and automatically learns the available physical components, such as servers, storage devices and networks. The SOIM server automatically learns the structure and attributes of each identified physical component.

Figure 8A:
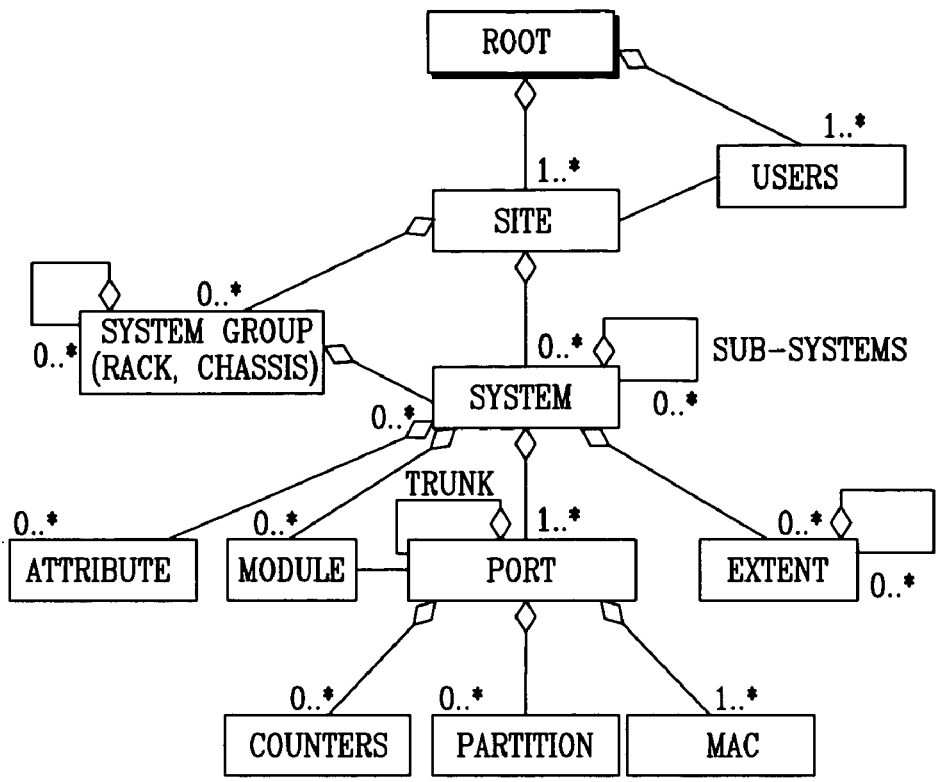
FIGS. 8A-8C, 9, 10A and 10B are software class diagrams that schematically illustrate class definitions in an object model, in accordance with an embodiment of the present invention.
Figure 8B:
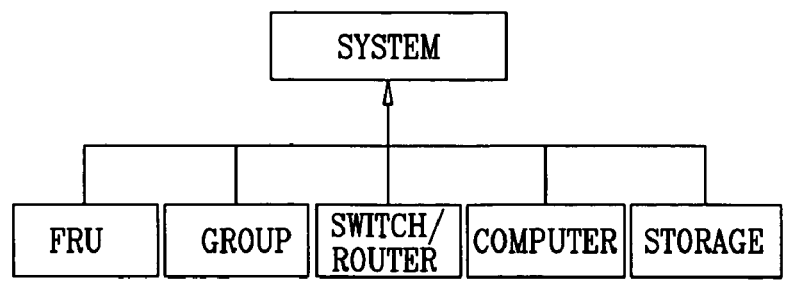
Figure 8C:
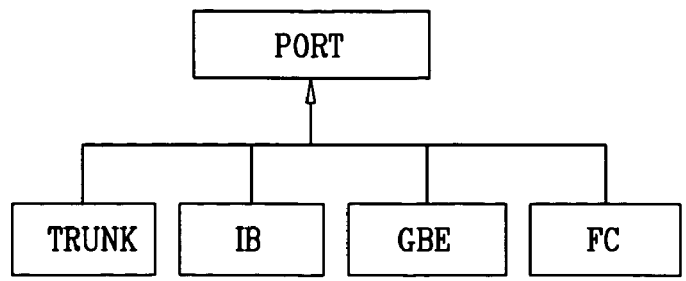

The SOIM server creates and populates a set of physical objects in model 48 with the learned physical components, at a physical object creation step 84. Typically, the SOIM server creates an object in model 48 for each identified physical component. The created object describes the structure and attributes of the physical component in hierarchical form, in accordance with the appropriate object class. Exemplary classes for representing physical components are shown in FIGS. 8A-8C below. The objects in the model are often technology-independent. For example, a port object has the same attributes (e.g., name, number, speed and status) regardless of whether it is an Infiniband, GbE or FC port.

The method continues with user 40 specifying a logical system definition, at a specification step 88. The logical system definition specifies the services, logical structure, topology and expected performance of the data center. The user specifies the logical computing, storage and networking resources of the data center, and the connections or relations/dependencies between them. The user may also specify high-level service attributes and access privileges for each logical resource and/or for the data center as a whole.

Typically, the user constructs the logical system definition from a set of predefined logical building blocks. Such building blocks may comprise, for example, services, logical servers, logical (virtual) networks and virtual storage objects (logical file or SAN-based volumes, volume groups). The user can specify the interfaces of these building blocks by creating logical links between the building blocks. The user can define logical properties of the logical links, such as their functionality, desired performance, availability requirements and/or security attributes.

An exemplary logical link is a virtual network interface card (NIC), which connects a logical server to a logical network. As another example, a logical disk is a logical link that connects a logical server to a storage object.

Additionally, the user can specify services or applications running on the virtual servers, such as, for example, a certain database application, a web application or a home-grown application. For each service or application, the user can indicate certain preferences. Each specified service may be linked to specific networks or network services (such as Hypertext Transfer Protocol (HTTP) and File Transfer Protocol (FTP) services), to storage objects, or to other services. The service specification and linkage can allow further optimization of system resource allocation in accordance with service objectives, as well as root cause failure or change analysis and automated response to such events, thus improving or guaranteeing service delivery.

In some embodiments, sets of logical servers can be arranged in domains, which are specified and managed collectively. Collective properties, such as access privileges or other administrative properties, can be defined for a particular domain. All logical servers of a particular domain inherit the domain's collective properties, unless specified otherwise.

In some embodiments, the logical system definition is not entered directly by a user, but is provided by an external automated application. For example, the SOIM server can interact with external management tools, such as HP Open-View, provided by the Hewlett-Packard Company (Palo Alto, Calif.). Details regarding HP OpenView can be found at www.h20229.www2.hp.com. Another exemplary external management tool is the Tivoli software, provided by IBM Corp. (Armonk, N.Y.). Details regarding this product are available at www-306.ibm.com/software/tivoli/. In these embodiments, the interface between the object model and the external application typically comprises a web-server interface, such as an interface based on the well-known web services definition language (WSDL) and web services resource framework (WSRF). Alternatively, any other suitable interface can be used.

An exemplary logical system definition may specify that grid 20 be configured to carry out a three-tier Oracle™ database system, which comprises a web server, a database server and an application server. In the requested system topology, all three servers are interconnected via a backend network. The web server is further connected to an external router via a second network. The user thus defines three logical servers and connects them using two logical networks, using terminal 44 (or, as noted above, using an external management tool via a suitable application interface). The user then defines high-level attributes and service level requirements of the system and of each component.

Any suitable man-machine interface (MMI) or external API can be used for constructing and entering the logical system definition. For example, terminal 44 may comprise a graphical user interface (GUI), which enables the user to construct the requested system diagram. The GUI may comprise predefined icons that represent logical objects such as servers, storage devices and network connections. The GUI may also comprise means for defining attributes of the different objects in the system diagram. Additionally or alternatively, the logical system definition can also be specified using a suitable command-line interface (CLI). An exemplary user interface, which comprises a combination of GUI and CLI, is shown in FIGS. 4-6 and 7A-7D below.

In addition to entering the logical system definition, the user interface enables the user to monitor, manage and modify the virtual data center. Generally, the user interface enables the user to view and control the specified data center, or any parts thereof, in different levels of granularity. For example, the user can view the entire data center, a particular server domain or a particular logical server. At each level, the user can view and modify the system topology and/or attributes.

SOIM server 36 creates and populates a set of logical objects in object model 48, based on the logical system definition, at a logical object creation step 92. Each logical object is created in a hierarchical form, in accordance with the appropriate predefined object class. Exemplary logical object classes are shown in FIGS. 9A and 9B below.

In alternative embodiments, steps 80-92 above can be carried out in different orders. For example, the logical system definition can be entered, and the logical objects created, prior to the automatic learning of physical components by the SOIM server. After steps 80-92 above are completed, object model 48 comprises multiple objects. Some of these objects comprise physical objects that describe physical components of grid 20. Other objects comprise logical objects, which were specified by the user in the logical system definition. Thus, object model 48 provides hierarchical, object-oriented modeling of both the grid and the logical system definition.

SOIM server 36 now allocates physical components to the different logical objects, at a resource allocation step 96. For each logical object, the SOIM server finds a suitable and available physical component in grid 20, and assigns the physical component to carry out the function of the logical object. The mapping of physical objects (i.e., physical grid components) to logical objects is not necessarily a one-to-one mapping. For example, a logical server specified by the user may require high processing power, which is not available in any single physical server 24 in the grid. In such a case, the SOIM server may assign two or more physical servers 24 to carry out the functions of the specified logical server. As another example, a single physical server may be assigned to two different logical servers, if the physical server has sufficient computational resources to perform both functions.

When allocating physical components to the different logical objects, the SOIM server takes into account the service-level definitions and other attributes defined by the user, so that the allocated resources perform their functions at the desired service quality. The SOIM server also considers other constraints imposed by the user. For example, as will be shown below, the user may constrain the maximum number and/or the proximity of physical components that may be used by a certain logical object.

Allocating the physical components also comprises allocating physical network resources, in accordance with the requested connectivity defined in the logical system definition. For example, different logical networks can be defined over network 32 by different virtual local area networks (VLANs), different network partitions (e.g., Infiniband P-Key) or different virtual private networks (VPN). The SOIM server can also assign IP addresses to the different network interface cards (NICs) of the physical components, in order to implement the desired connectivity. The SOIM server can pool, segment or prioritize network resources to satisfy logical network link objectives such as performance, availability and/or security.

In the object model, allocating physical components to logical components is performed by pointing from logical objects to the physical objects allocated to implement them. The mapping of physical objects to logical objects is performed throughout the different hierarchy levels of the object model. In particular, low-level logical objects are mapped to low-level physical objects (e.g., logical port to physical port, logical storage device to physical disk). Note that the mapping of logical objects to physical objects is not necessarily a 1:1 mapping. For example, portions of a certain port, or an aggregation of several ports can be mapped to a particular interface. Similarly, a portion of storage device or an aggregation of several storage devices can be mapped to a logical storage volume.

At this stage, each logical object in object model 48 points to one or more physical objects in the object model, which are allocated to perform its functions.

The SOIM server now configures the different physical components, in accordance with the assigned functionality of each physical component, at a component configuration step 98. For example, the SOIM server links each physical server to the location of the appropriate boot image, using which the physical server is to boot. Typically, the SOIM server maps or unmasks the desired storage location to the server, and then powers up the physical server. Alternatively, the SOIM server can notify the physical server with the location of the boot image. The SOIM server also configures the network adapters, channel adapters or network device drivers of the different physical servers 24 and storage devices 28, in accordance with the desired network connectivity.

Other configuration-related operations, which may be carried out by the SOIM server, may comprise the configuration of other components such as network/SAN switches, network/SAN routers, load balancers, firewalls, applications, server/storage virtualization tools, dynamic host configuration protocol (DHCP) servers, and name servers such as domain name service (DNS) servers.

Configuring the logical networks may comprise VLAN configuration (when network 32 comprises an Ethernet network) and/or P-Key and membership configuration (when network 32 comprises an Infiniband network). Quality-of-service (QoS) configuration may comprise bandwidth allocation and/or definition of service levels and virtual lanes in Infiniband networks.

The configuration of network services may comprise DHCP, DNS, network information service (NIS) and web server configuration. Storage-related configuration may involve configuring SAN and network-attached storage (NAS) components. The configuration may comprise the creation of soft, virtual storage zones using logical unit number (LUN) masking, as well as the configuration of NAS and network file system (NFS) servers and clients.

Figure 11:
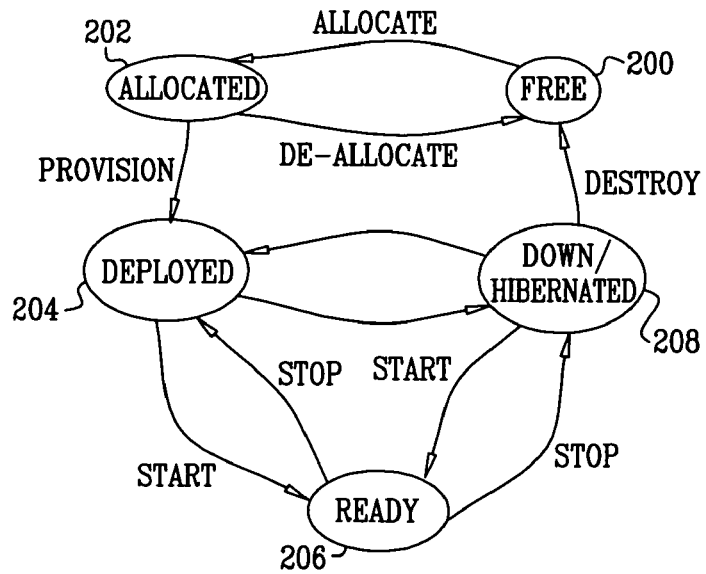
FIG. 11 is a state diagram that schematically illustrates a method for deploying a server, in accordance with an embodiment of the present invention.

The SOIM server then deploys the different physical components, and in particular the applications running on these components, at a component deployment step 100. The SOIM server controls each physical component to boot, using the appropriate boot image. An exemplary method for deploying a server is shown in FIG. 11 further below.

After completing step 100, grid 20 is configured and operational, carrying out the logical functionality defined by the user at step 88 above.

The SOIM server monitors the operation of the grid, at a monitoring step 102. In particular, the SOIM server monitors the performance of the different physical components and applications, and compares them to the service-level definitions specified by the user.

The SOIM server reports the performance and status of the grid to the user, at a status reporting step 104. As noted above, the user is usually only aware of the logical structure of the data center, and not of the physical structure of the grid. The user usually has no knowledge of the hardware configuration, underlying technology or geographical location of the physical components. Thus, the SOIM server translates the status information monitored at step 102 above to information that is associated with logical objects, as known to the user. (The user can still query the physical structure and status of the grid, such as for examining the outcome of the automated operation for verification or troubleshooting.)

For example, assume that the SOIM server detects a failure in one of physical storage devices 28 in grid 20. The failed storage device may be allocated to one or more logical objects. Therefore, the SOIM server finds, using the object model, all logical objects that use the resources of the failed physical storage device. The SOIM server then reports a failure in these logical objects to the user. The SOIM server similarly translates failures in other physical components, e.g., physical servers and networks, to failure reports associated with the appropriate logical objects. The SOIM server then reports the logical object failures to the user.

Additionally or alternatively, the SOIM server translates and reports status information other than component failures. For example, the SOIM server can evaluate performance metrics and statistics associated with a particular logical object, such as the remaining storage space in a certain logical storage device, the throughput of a certain logical network, or the aggregated CPU utilization of a certain logical server.

The SOIM server calculates these performance metrics by finding, using the object model, which physical components are mapped to the logical object in question, and translating the performance of these physical components to the desired logical object performance metrics. In particular, the SOIM server may alert the user when a certain logical object deviates from the service-level definition specified for this object.

The SOIM server checks whether a change in configuration is necessary, at a re-configuration checking step 106. A change of configuration may be triggered by several conditions and events. For example, when a physical component fails, another physical component should be allocated to replace the failed component. When the physical configuration of the grid changes, such as due to component replacement or upgrade, the allocation of physical components to logical objects should be modified accordingly. As another example, when a service-level condition is not met, additional physical resources should be allocated to improve the performance level.

Additionally or alternatively, the user may modify the logical system definition during operation, triggering a corresponding modification in the configuration of the grid. Alternatively, as noted above, the logical system definition may alternate between two or more predefined configurations over time. Thus, re-configuration may be triggered by the time of day, day of the week and/or, by the date, or by an explicit instruction from the user.

If no change in configuration is triggered, the method loops back to monitoring step 102 above, and the SOIM server continues to monitor the grid. Otherwise, the SOIM server updates the object model and performs the desired grid re-configuration, at a re-configuration step 108.

If the re-configuration is triggered by a change in the physical configuration of the grid, the SOIM server locates the physical components affected by the change. The SOIM server then determines the logical objects associated with these physical components. The SOIM server re-allocates physical components to the affected logical objects, in order to adapt to the change.

When the re-configuration is triggered by a change in the logical system definition, the SOIM server allocates physical components to any newly-defined logical object. When an existing logical object is deleted or modified, the SOIM server releases and/or re-allocates physical components accordingly.

The method then loops back to component configuration step 98 above, and the SOIM sever re-configures and re-deploys at least some of the physical components, in accordance with the adapted grid configuration.

Logical System Definition Example

FIGS. 4-6 and 7A-7D are diagrams that schematically illustrate user interface screens in an exemplary process of specifying a logical system definition of the data center, in accordance with an embodiment of the present invention. The figures demonstrate an exemplary methodology and associated user interface, which can be used for this purpose. In the present example, the specified data center comprises a three-tier database application.

Figure 4:
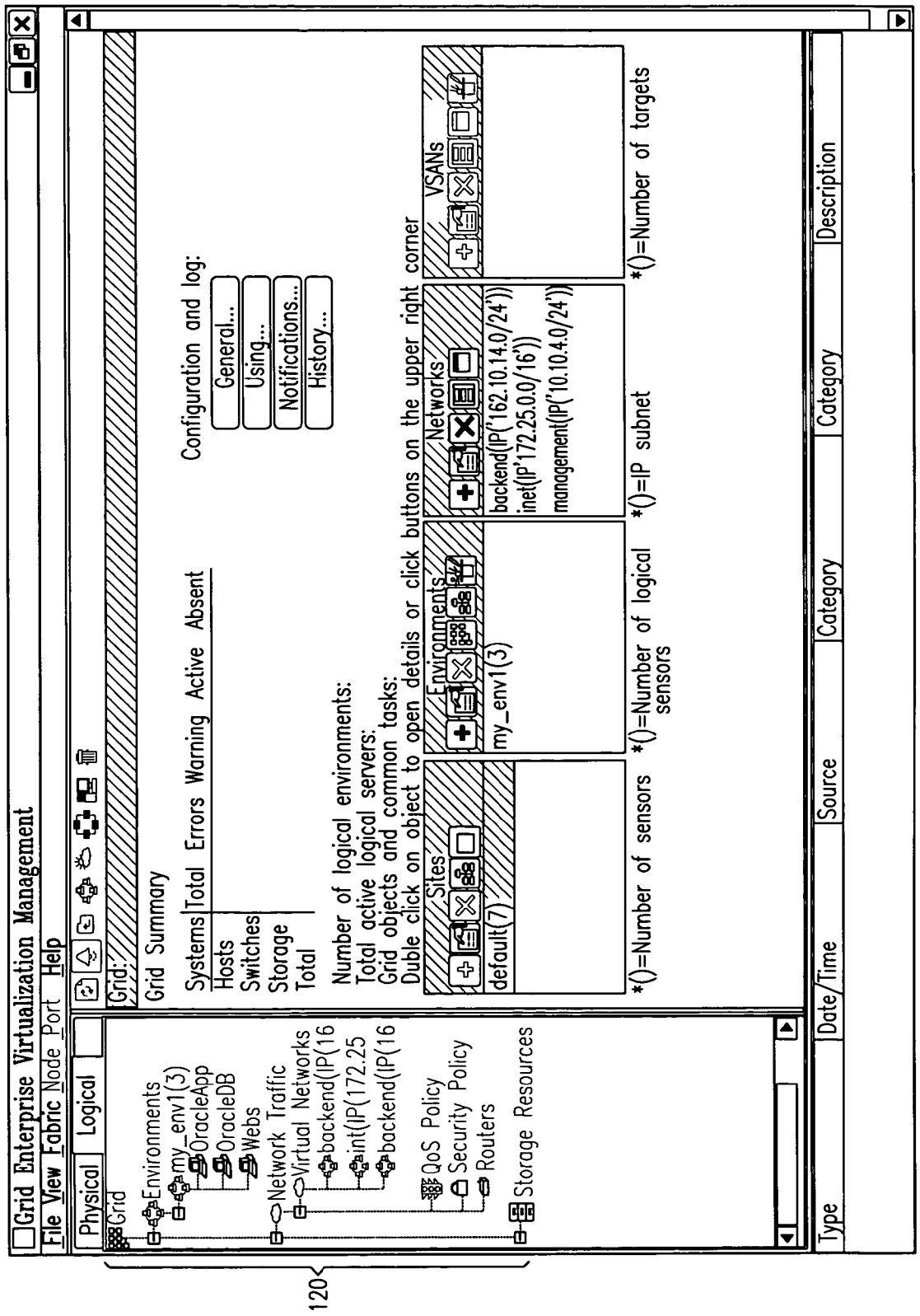
FIGS. 4-6 and 7A-7D are diagrams that schematically illustrate user interface screens in a process of specifying a logical system definition of a virtual data center, in accordance with an embodiment of the present invention.

FIG. 4 shows a screenshot of the main definition window. On the left hand side of the window, the entire modeling environment is displayed as a tree 120. By clicking on different tree entries, the user can inspect and modify the different elements of the logical definition in different levels of granularity.

The specified data center is represented as a virtual environment denoted my_env1. Environment my_env1 comprises an application server, a database server and a web server, denoted OracleApp, OracleDB and webs, respectively. Networking in the specified data center comprises two logical networks denoted backend and inet. A third network, denoted management or mng, is intended for internal monitoring purposes and is not part of the logical system definition.

The tree also comprises entries that enable the user to modify and inspect logical storage resources, QoS policies and security policies. A sub-window of each selected tree entry appears on the right hand side of the main window. A toolbar at the top of this window comprises buttons that enable the user to modify the relevant tree entry.

Figure 5:
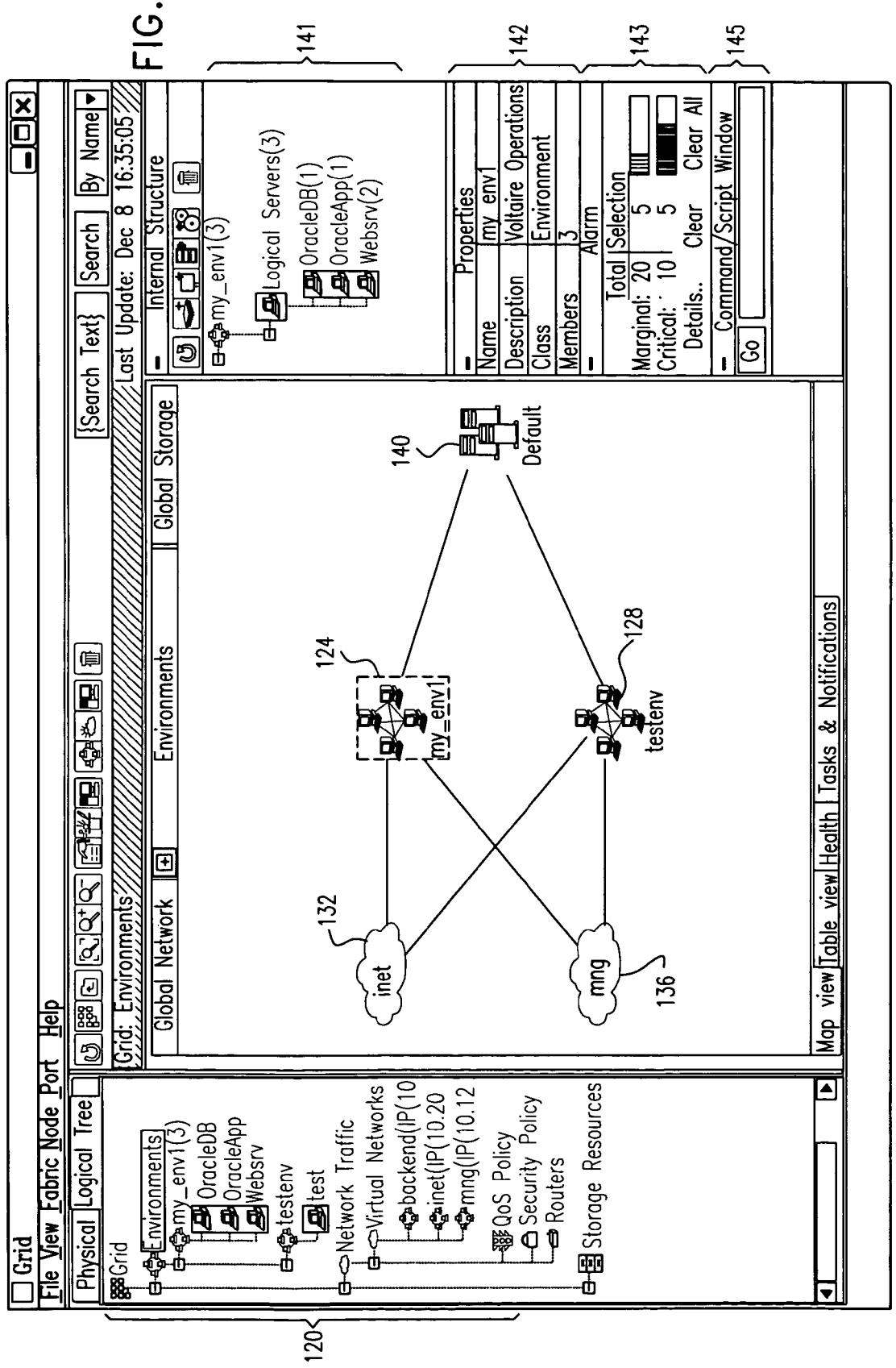

FIG. 5 shows a screenshot of the specified environments. This window is shown when the user selects the "environments" entry in tree 120. The window shows the specified data center 124 (my_env1) connected to a monitoring environment in graphical form. The monitoring environment comprises a virtual monitoring system 128, called testenv, an inet network 132, an mng network 136, and a default global storage resource 140.

When my_env1 124 is selected, information regarding this environment is displayed on the right hand side of the window. The information comprises a tree 141 representing the internal structure of the environment, a window 142 showing some of the high-level properties of the selected environment, and another window 143 showing alarm information. A command-line interface (CLI) window 145 is also provided.

Figure 6:
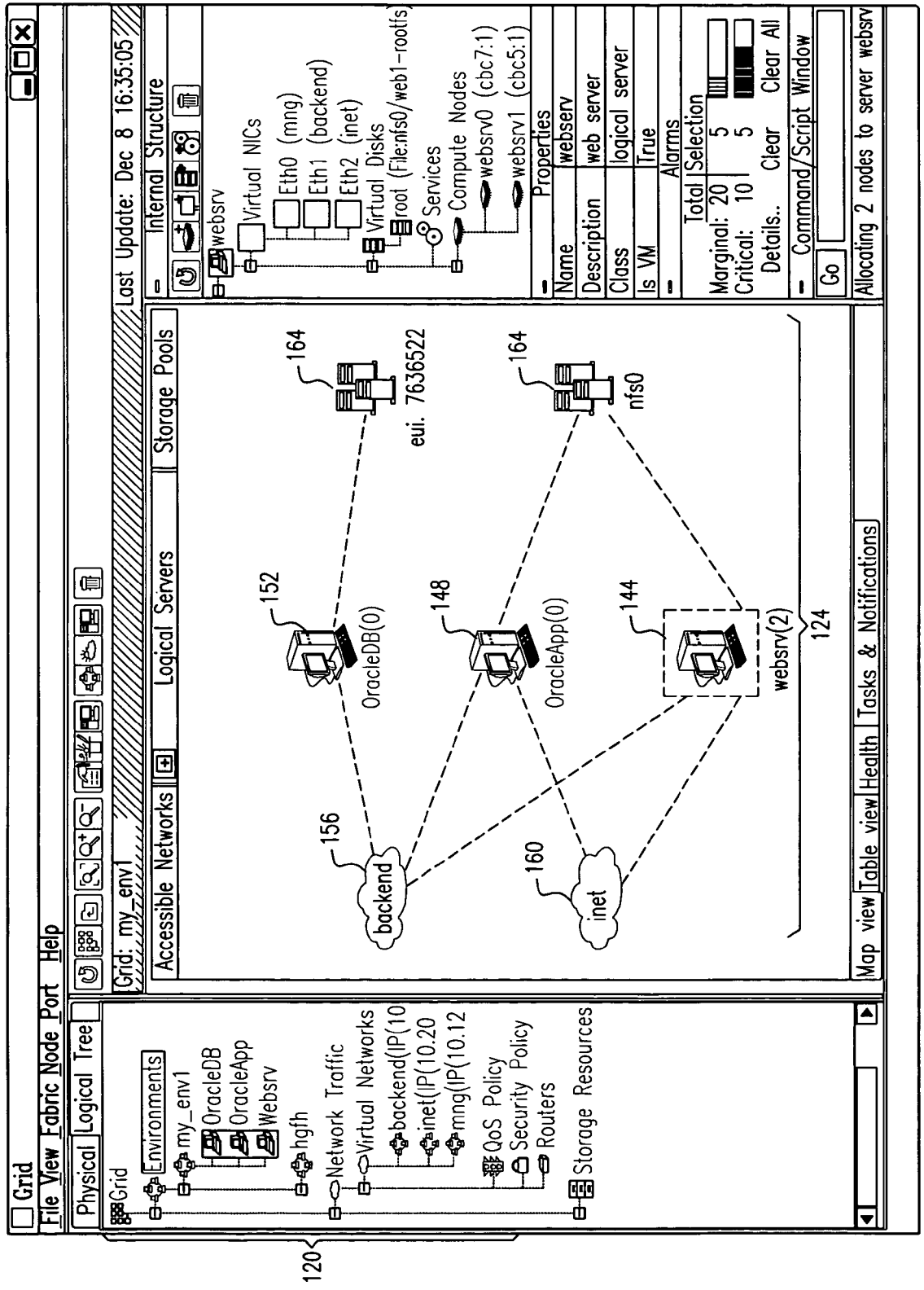

FIG. 6 shows a screenshot of a window displaying a graphical system diagram of my_env1 124, the specified data center. This window is displayed when the user selects the my_env1 entry in tree 120 or in the graphical diagram of FIG. 5 above. The system diagram shown the three logical servers webs, OracleApp and OracleDB, represented by icons 144, 148 and 152, respectively. Networks backend and inet, which are also part of the logical system definition, are represented by icons 156 and 160, respectively. Logical storage resources 164 are connected to the logical servers. Lines connecting the icons represent the connectivity among the logical servers, networks and storage resources Other possible views, not shown in the figures, may focus on services and inter-service relations, or focus specifically on networking/storage components.

In the present example, the user selected to query the information of web server by selecting icon 144. As a result, tree 141 and windows 142 and 143 show the structure and properties of the selected server.

The user constructs the system diagram of the specified data center by selecting predefined logical server, network and storage objects from the toolbar at the top of the window, and then creating connections among the objects to specify the desired system connectivity. The user can then specify certain attributes of the logical objects.

FIGS. 7A-7D show screenshots of an exemplary wizard for defining a logical server, as part of the logical system definition process, in accordance with an embodiment of the present invention.

Figure 7A:
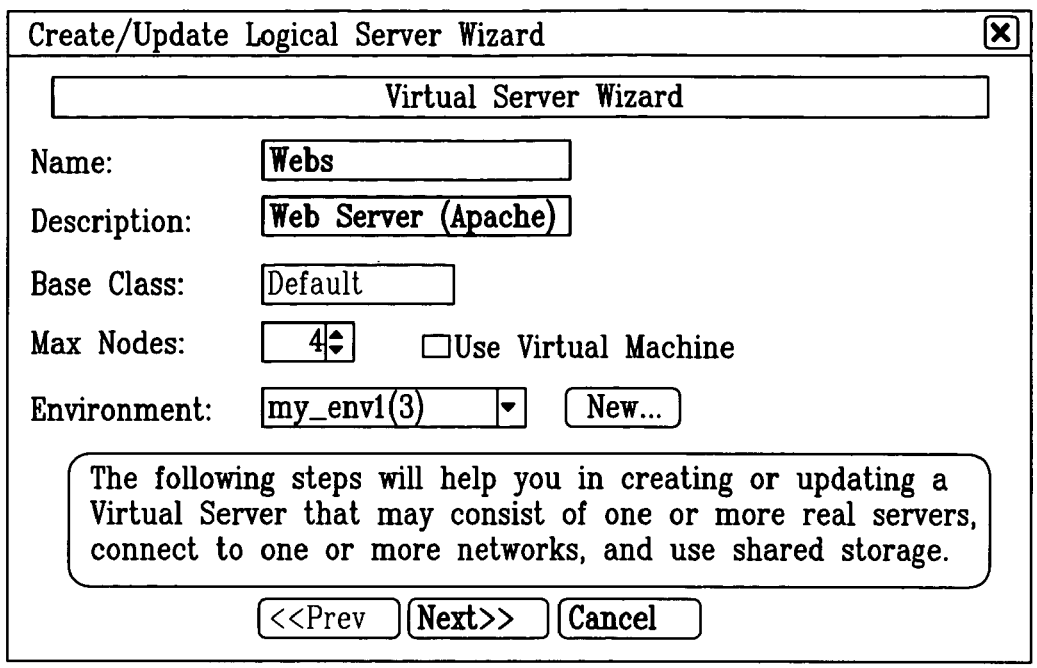

FIG. 7A shows the initial window of the wizard, in which the user enters the server name, description and class, and the environment to which the server belongs (my_env1 in the present example). The user can also specify whether or not the logical server comprises a physical or a virtual server. When the logical server comprises a virtual server, the user can limit the maximum number of physical compute nodes that may be used to realize the virtual server.

Figure 7B:
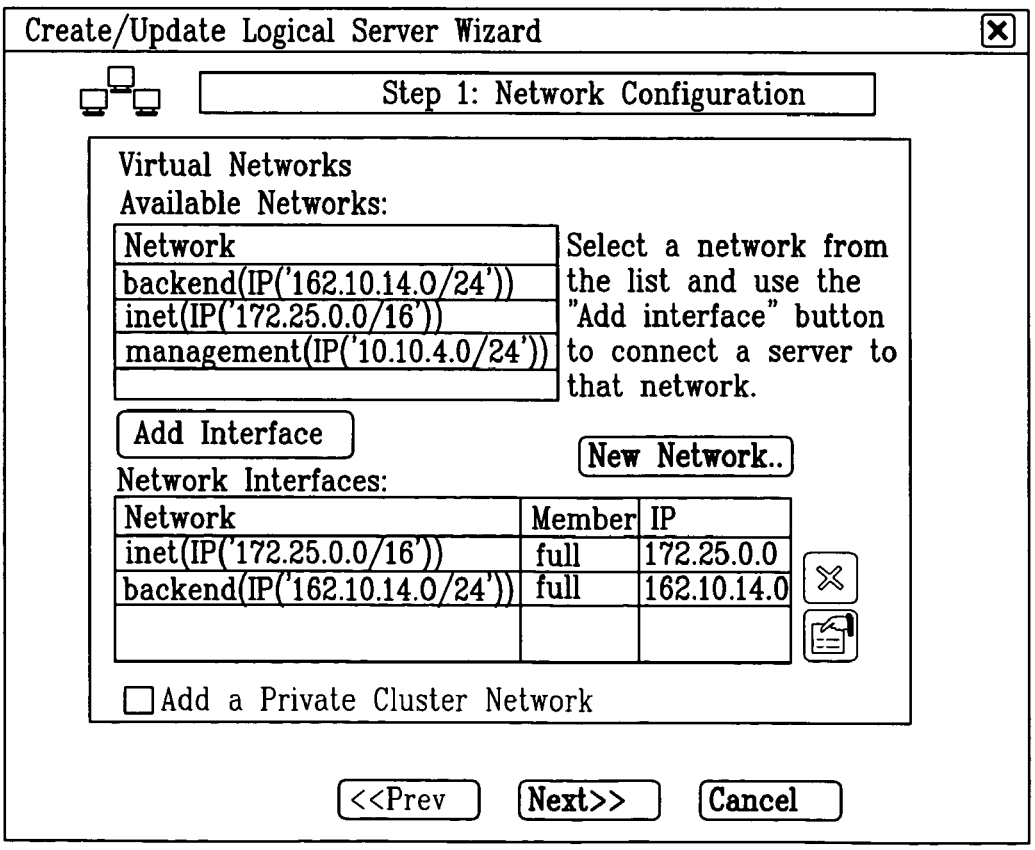

FIG. 7B shows the second window of the wizard. In this window, the user selects the logical networks that are connected to the logical server, and configure the parameters of the server's network interfaces. The user can also define a new logical network from this window. Logical networks can be defined as having certain service, security, and/or availability levels. The logical networks can be mapped to different virtual local area networks (VLAN) tags, different Infiniband partition key (P-key) values or different VPNs. Using the wizard, the user can add, delete, configure and modify the virtual NICs of the logical server being specified. Each virtual NIC can be configured as having either full or limited network membership.

Other virtual network attributes, which can be defined by the user, may comprise the network name, IP addresses, IP subnet and/or QoS. Any desired network hierarchy can be defined using these attributes. In general, a single logical network may span multiple protocols, locations and types of physical networks. For example, a single logical network may be defined over both an Infiniband network and a GbE network, and may cross over a VPN tunnel over the Internet. Physical entities and functions, such as routers or bridges, which mediate between these technologies or networks, are not part of the logical system definition although they are part of the physical configuration.

A logical network can thus be viewed as a collection of endpoints (e.g., virtual NICs or virtual router ports). A virtual port may be implemented using more than one physical interface, such as when using port bonding or automatic path migration (APM). In these cases, a single IP address can use two or more physical ports for high availability. Each virtual NIC may run multiple network services. The network services typically comprise layer-4 services, such as HTTP or FTP, but may also comprise higher-layer services, such as the Simple Object Access Protocol (SOAP), tunneled over HTTP. In some cases, logical routers can be defined, in order to connect logical networks to one another. The logical routers can perform traffic management tasks, such as packet filtering (e.g., firewall functionality), routing, load balancing and QoS management.

The user can define the IP addresses of each virtual NIC. When the logical server comprises a server cluster, the user can define a range or a list of IP addresses, from which the SOIM server picks specific addresses when it provisions the specific physical servers. Alternatively, the user can leave the IP addresses undefined, in which case the SOIM server assigns available IP addresses automatically.

Figure 7C:
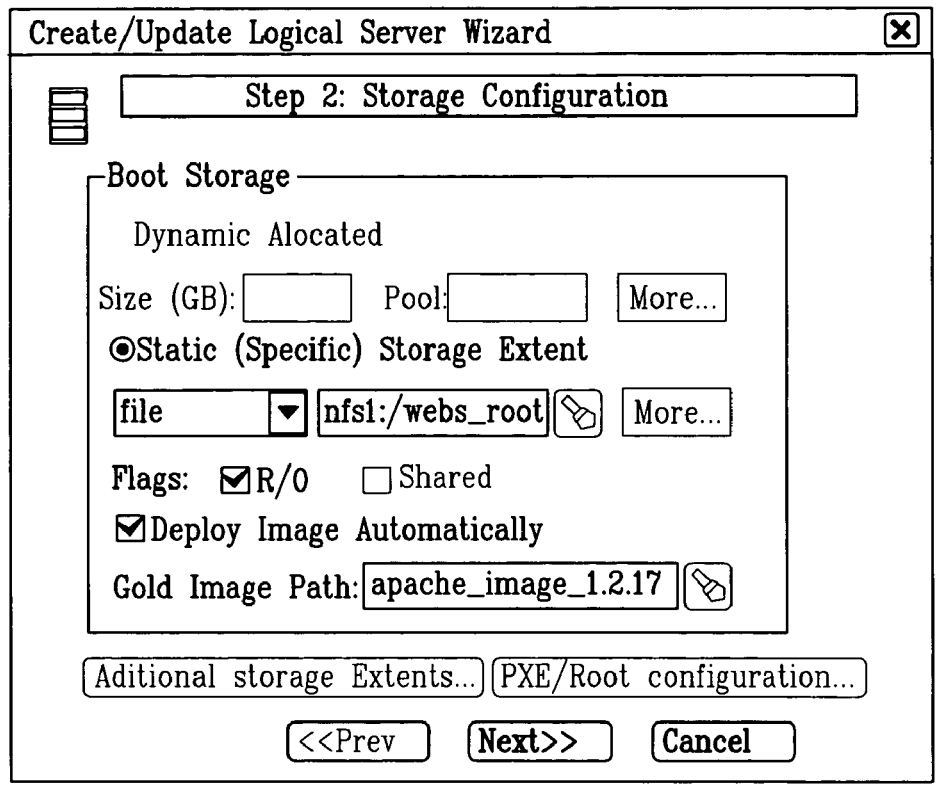

FIG. 7C shows the third window of the wizard, in which the user specifies the storage configuration of the logical server being defined. As noted above, communication with storage devices may use any suitable protocol, such as SCSI, iSCSI, InfiniBand and FC. In some embodiments, grid 20 uses iSCSI and the Internet storage name service (iSNS) model as the primary mode of communication with storage devices. Non-iSCSI storage devices, such as FC devices, are mapped to SCSI conventions, in accordance with the iSNS specification.

In some embodiments, the logical storage devices are associated with virtual SANs (VSANs), e.g., iSCSI domains or zones. A VSAN comprises a set of initiators (logical servers or storage routers) and target storage devices. The initiators and targets may be connected to one another using multiple portals or paths, which are part of the logical system definition. Each such path, connecting an initiator to a target, is referred to as a storage link, and may have high availability (HA), QoS and security attributes. VSANs are typically connected to one another using virtual storage routers. Virtual storage routers can also be used to cluster multiple physical storage devices into a single virtual storage device.

SOIM server 36 uses iSCSI naming conventions, in order to provide common naming for different types of storage networks and devices. For IP and Infiniband storage devices, iSCSI names are used to identify targets. For FC storage devices, the SOIM server uses standard iSNS mapping, as is known in the art.

The SOIM server provides storage resources to logical servers, regardless of the physical component used to implement the logical server. For this purpose, the storage provisioning mechanism binds to logical entities of the logical server, such as the server name or IP addresses, rather than to the hardware medium access control (MAC) addresses of the server. Thus, when a logical server migrates to a different physical component, its storage configuration remains intact.

The association of a logical server with a particular storage volume can be defined as read/write (R/W), read-only (R/O). In some embodiments, when defining the storage environment of a particular logical server, the user specifies the location in which the boot image of the server is stored. When the logical server comprises a server cluster, in which case multiple physical servers share the same storage volume, the shared boot image is protected from being corrupted using one of several methods.

For example, a cluster file server can be defined to protect write operations. Alternatively, a storage volume that holds the boot images of all servers in the cluster can be defined as read-only. Further alternatively, multiple replicas or snapshots of the shared boot image can be stored, with each physical server booting from a different replica or snapshot. The replicas can be arranged in a list of volumes having identical size and content, and each physical server in the cluster is assigned the next available volume from the list.

Figure 7D:
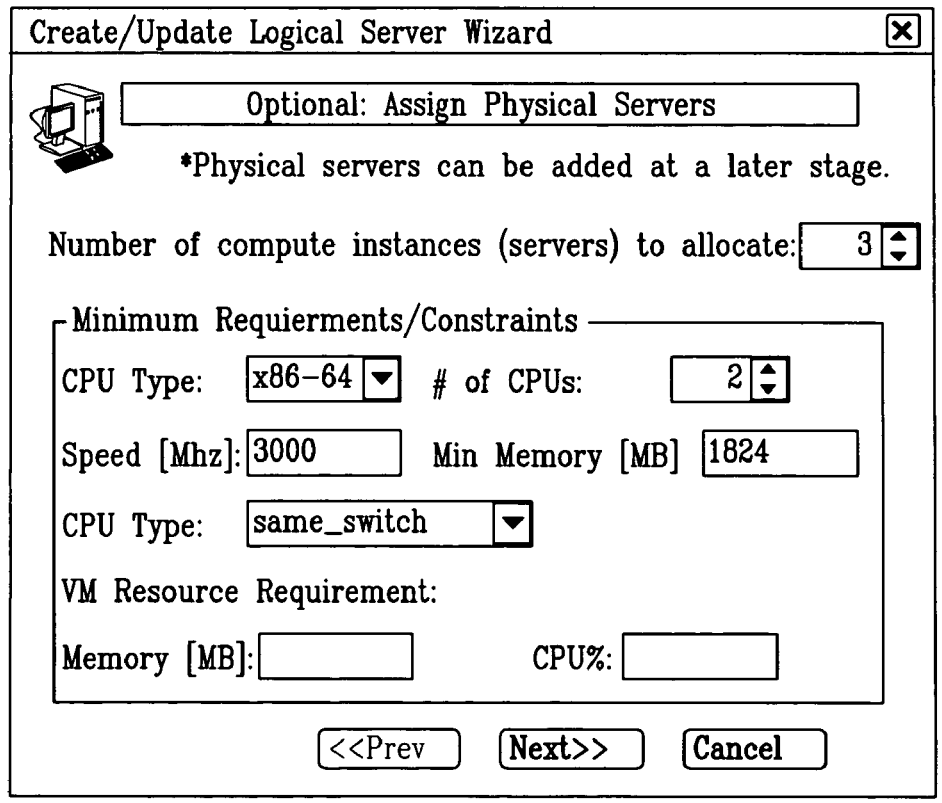

FIG. 7D shows the fourth window of the wizard. In this window the user defines the properties of the physical servers, or compute nodes, which will be used to implement the specified logical server. For example, the user can limit the maximum number of compute nodes and define the CPU type and the number of CPUs in each compute node. The user can also specify the clock speed and memory size of the compute nodes. The proximity of the compute nodes can also be specified. For example, the user can specify that all compute nodes be attached to the same switch.

In some embodiments, the user can define end-points of the services running on the logical server. The service end-points are later used for creating and/or validating application or transport layer security, quality-of-service (QoS) and load balancing rules. The user may also define additional logical server attributes, such as pre-boot execution environment (PXE) configuration, file services and user identities.

Group Operations

Some of the monitoring and/or modification operations of SOIM server 36 can be applied collectively groups of objects. Physical and/or logical objects can be associated with a group in several ways. For example, multiple ports connected to a certain compute node or storage device can be grouped using link aggregation (LAG). Another exemplary grouping may refer collectively to all switches or routers of a certain type. All ports of a particular type, such as all Infiniband ports, can be referred to collectively. Additionally or alternatively, any other suitable set of physical and/or logical objects can be grouped, and operations applied collectively to the group.

Typically, each object group is assigned a name, and each item in the system is assigned a unique identification (ID). Operations that may be applied collectively to a group may comprise, for example, setting object attributes (e.g., partitioning, QoS or load balancing), viewing attributes, and activating or deactivating objects. By default, an operation applied to a group is inherited by all group members. The user can override this default condition as desired.

Exemplary Object Model Classes

FIGS. 8A-8C, 9, 10A and 10B are diagrams that schematically illustrate exemplary class definitions in object model 48, in accordance with an embodiment of the present invention. In these figures, each class is represented by a rectangle identified with the class name. Arrows connecting the rectangles represent relationships between classes, wherein the shape of each arrowhead indicates the type of relationship. Aggregation relationships are shown as diamond-shaped arrowheads. Association relationships are shown as lines without arrowheads. Inheritance relationships are shown as ordinary arrowheads. When an aggregation relationship can have one or more objects, the relationship is marked with a "1 . . . *" label. Similarly, "0 . . . *" denotes zero or more and "1" denotes exactly one object.

FIG. 8A shows an exemplary class hierarchy for representing physical grid components. The "Root" class corresponds to the entire system. The "Site" class corresponds to a particular physical location. Generally, the system may comprise multiple sites.

The "system group" class represents an arbitrary collection of systems, such as a rack or chassis. The "System" class corresponds to specific physical components. For example, servers, storage devices, switches and routers are all objects that belong to the "System" class. A system object comprises a physical entity having a unique ID, a name, a location, a type and possibly additional attributes. The subclasses of the "System" class are shown in grater detail in FIG. 8B below.

As indicated by the "Port," "Extent," "Module" and "Attribute" classes, each system may have one or more physical ports, potentially storage extents, sub modules, and list of attributes. As shown by the "MAC," "Counters" and "Partition" classes, port classes may have multiple MAC addresses, multiple counters, and may connect to multiple VLANs or Partitions (in addition to general port properties associated with the "Port" class).

As noted above, the SOIM server creates physical objects in accordance with the hierarchy of FIG. 8A when it automatically learns the physical configuration of the grid, at step 80 of the method of FIG. 3 above. For example, when the SOIM server identified a port of a certain physical server, it adds a "Port" object to the "System" object of this server. The different objects are typically implemented as tables of a relational database system, and are stored in SOIM database 60.

FIG. 8B shows the subclasses of the "System" class. For example, a physical component can be classified as being a field-replaceable unit (FRU), such as a line card or server blade, which is associated with the "FRU" subclass. Components that are represented as a group of systems can be associated with the "Group" subclass. Other physical components can belong to the "Switch/Router," "Computer," or "Storage" subclasses.

FIG. 8C shows the subclasses of the "Port" class. Any discovered port is classified to one of the "Trunk," "IB," "GbE," "FC" subclasses. Typically, ports of different technologies have similar attributes, which mainly differ in names or representations. Thus, the "Port" class comprises the common attributes, so that ports of different technologies can be managed in a uniform manner. Other attributes, which are specific to a particular technology, are defined in the "IB," "GbE" and "FC" subclasses. The port attributes may comprise, for example, the link technology, a permanent port address, a parent definition, a port number, a maximum transmission unit (MTU), a current operational state of the port, a requested state of the port, a caption, a maximum speed, an actual speed, a network address, a trunk group, a media definition, an auto-sense flag, a full-duplex indication, a port type and a partition definition.

Figure 9:
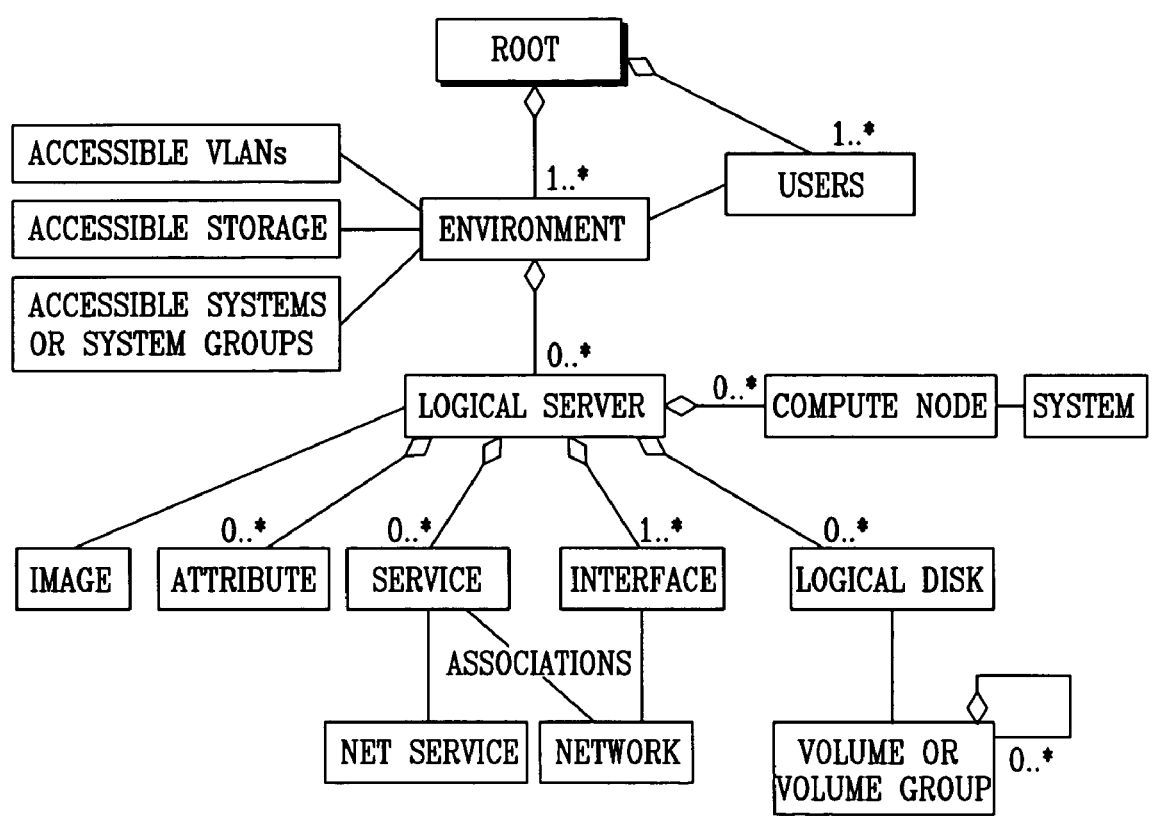

FIG. 9 shows an exemplary class hierarchy for representing logical objects. The logical objects are defined by the user as part of the logical system definition, at step 88 of the method of FIG. 3 above. The "Root" class corresponds to the entire system. The "Environment" class corresponds to a particular logical environment, such as the "my envy" environment described in FIGS. 4-6 above. When using the particular "Environment" object, access may be restricted to only a subset of the VLANs, storage devices and systems defined for the entire system. These accessible objects are defined by the corresponding "Accessible VLANs," "Accessible storage" and "Accessible systems or system groups" classes.

Different logical servers are represented using the "Logical server" class. Each logical server has of zero or more logical disks, represented by the "Logical disk" class, which connect the server to a storage volume. The server may have one or more network interfaces ("Interface" class objects), which connect the server to a "Network" object, and zero or more services ("Service" class objects) running on it. The services can bind to one or more networks and optionally to specific network services. The server can also have a list of attributes ("Attribute" class), and potentially an associated operating system image ("Image" object) definition.

Figure 10A:
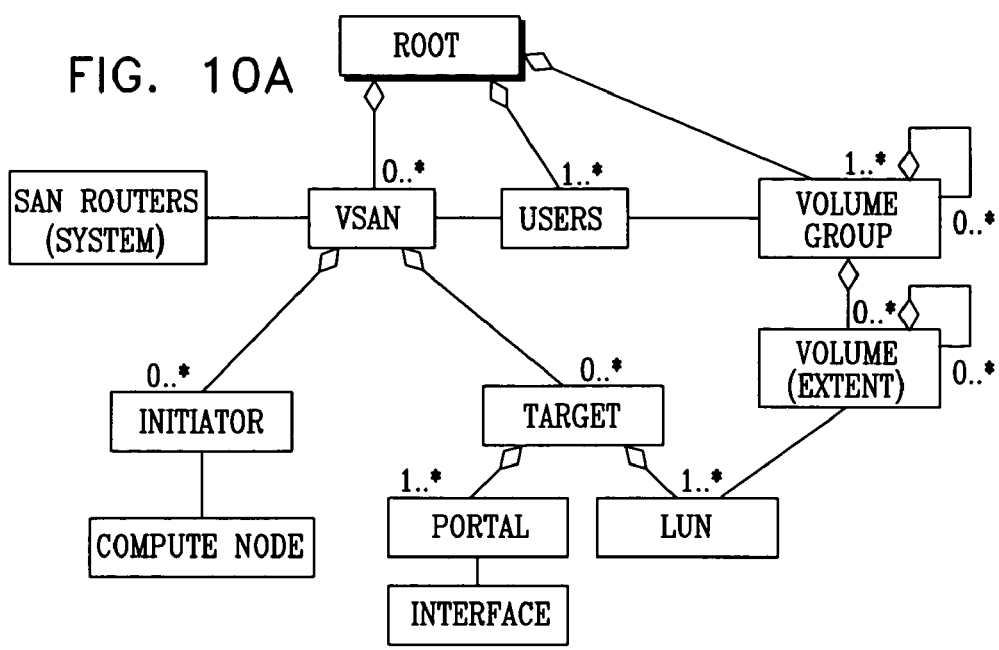

FIG. 10A shows an exemplary class hierarchy for storage networking. A certain "VSAN" object may have zero or more storage initiators ("Initiator" objects), which may comprise compute nodes. The SAN object may have zero or more storage targets ("Target" objects), which may comprise portals or storage volumes ("Extent" objects).

Figure 10B:
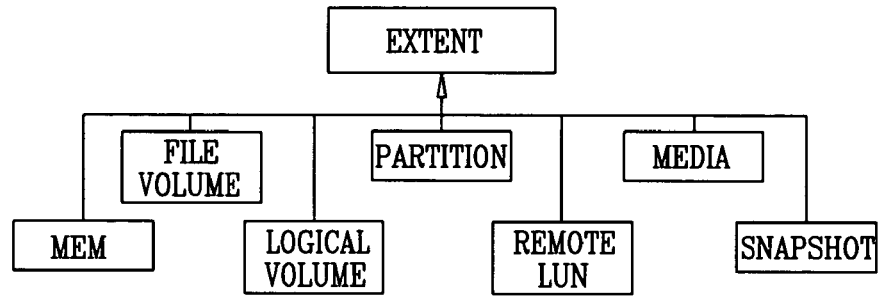

FIG. 10B shows the subclasses of the "Extent" class. An "Extent" represents a contagious storage resource. There may exist multiple implementations of such a resource. A "Memory" object represents a memory-based storage device, such as a memory-based disk, a random access memory (RAM) drive or a flash-based non-volatile RAM. A "File volume" object represents a file, which is maintained in a local file system or a remote file server. A "Logical volume" object represents a composition of multiple storage elements or a portion of a particular storage element, mapped to a single virtual storage space. For example, a logical volume may comprise a stripe, which is set across multiple physical disks to gain a larger storage space and/or better performance.

A "Partition" object represents a portion of a disk drive, which is typically pointed to by a partition table located on the disk (typically at the beginning of the disk). A "Remote LUN" object represents a remote storage device, which can be accessed via a SAN. A "Media" object represents a physical disk media. A "Snapshot" object represents snapshot of a storage extent, at a particular point in time.

Note that the "Extent" class definition may be recursive. For example, a given partition may be based on a volume, which is itself based on multiple SAN LUNs. For this reason, the "Volume/extent" object in FIG. 10A above has an aggregation relationship arrow looping back to itself.

FIG. 11 is a state diagram that schematically illustrates a method for deploying a logical server, in accordance with an embodiment of the present invention. This method can be used to track a particular server along its different "life-cycle" stages in the virtual data center. SOIM server 36 maintains and tracks a similar state machine for each logical server in the logical system definition.

Initially, the server is free, i.e., unallocated, at a free state 200. When server is allocated to a particular logical object, the server transitions to an allocated state 202. When the server is allocated, as described above, it is allocated suitable storage and networking resources. The server can later be de-allocated and brought back to free state 202 by the SOIM server.

When the server is provisioned, it transitions to a deployed state 204. When moving from allocated state 202 to deployed state 204, the server's networking and storage resources are configured, and the location of its boot image is defined.

The server can then be activated, and moved to a ready state 206. When moving from "deployed" to "ready," the server is booted, its network services and applications are initialized and its correct operation is verified.

The server can be stopped by the SOIM server at any time, and moved back to the "deployed" state. A "Down/Hibernate" state 208 is also defined, in which the server is fully configured but inactive. From this state, the server can be moved to either the "deployed" state, the "ready" state or be de-allocated and moved to the "free" state by the SOIM server.

The following list gives an exemplary sequence of actions for creating (allocating, provisioning and starting) a logical server:

Physically install server or identify available server platform (physical or virtual).
Connect server to management network. Configure network services if needed.
Provision boot Storage logical volume (logical unit number—LUN). Either identify existing LUN with a suitable operating system and file system, create a new LUN, or create a snapshot copy.
Configure the server name, management IP address and SSH.
Run local/remote configuration script (configure other IP addressees, date and time, mount shared and/or other storage volumes, install and/or upgrade software packages, configure and/or tune system, optionally reboot server).
Configure network services.
Connect to operational networks/VLANs.
Start services (run start script).

The following list gives an exemplary sequence of actions for destroying (i.e., releasing) a logical server:
Stop services.
Disconnect from operational networks/VLANs.
De-allocate network services.
Un-install software (may be desirable due to licensing).
De-allocate unique and/or shared storage resources.
Shutdown.

Although the embodiments described herein mainly address configuration and operation of virtual data centers, the principles of the present invention can also be used in any other data processing or computing environment, such as in testing and quality assurance (QA) applications, computing centers running computer-assisted design (CAD) simulations, flow simulations, scientific applications, or any other application. Enterprise applications may comprise, for example, financial applications, human resources management applications, customer relationship management applications and/or any other suitable application.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for computing, comprising:
specifying a data processing system using a logical system definition, which defines logical system components having respective functionalities and a topology for interconnecting the logical system components, wherein the logical system components comprise one or more logical ports, and wherein the logical system definition defines a logical server for carrying out a data processing task;
representing the logical system components using respective logical objects in a hierarchical object model, including given logical objects that represent the logical ports and the logical server;
representing physical resources of a grid computer system that includes one or more physical ports using physical objects in the hierarchical object model, including given physical objects that represent the physical ports and including grid servers comprising both physical and virtual servers;
automatically mapping the logical objects to at least some of the physical objects, including mapping the given logical objects to the given physical objects, so as to allocate the physical resources to carry out the respective functionalities of the logical system components, wherein a plurality of the grid servers, including at least one virtual server, are assigned to the logical server; and
configuring and activating the allocated physical resources so as to cause the grid computer system to function as the data processing system, in accordance with the logical system definition.

2. The method according to claim 1, wherein the logical system components comprise at least one component selected from a group of components consisting of logical servers, logical storage devices and logical networks.

3. The method according to claim 1, wherein the logical objects comprise hierarchical objects comprising at least one class selected from a group of classes consisting of a root class, an environment class, a users class, a logical server class, a compute node class, an image class, an attribute class, a service class, an interface class and a logical disk class.

4. The method according to claim 1, wherein specifying the data processing system comprises specifying a service running on one or more of the logical system components, and wherein configuring and activating the allocated physical resources comprises configuring and activating the service on the allocated physical resources.

5. The method according to claim 1, wherein the physical resources comprise at least one component selected from a group of components consisting of physical storage devices, virtual storage devices and communication networks.

6. The method according to claim 1, wherein the physical objects comprise hierarchical objects comprising at least one class selected from a group of classes consisting of a root class, a site class, a users class, a system group class, a system class, an attribute class, a module class, an extent class and a port class.

7. The method according to claim 6, wherein the system class comprises at least one subclass selected from a group of subclasses consisting of a field replaceable unit (FRU) subclass, a group subclass, a switch/router subclass, a computer subclass and a storage device subclass.

8. The method according to claim 1, wherein specifying the data processing system comprises:
   specifying two or more logical servers;
   specifying logical network connections that interconnect the logical servers, so as to implement the specified topology; and
   specifying logical storage devices to be used by the logical servers.

9. The method according to claim 1, wherein representing the physical resources comprises automatically identifying the physical resources in the grid computer system and learning attributes of the identified physical resources.

10. The method according to claim 1, wherein representing the logical system components and physical resources comprises arranging the logical and physical objects in multiple levels of hierarchy in the object model, and wherein automatically mapping the logical objects to the physical objects comprises pointing from the logical objects to the corresponding physical objects at the multiple levels of the hierarchy.

11. The method according to claim 10, wherein pointing from the logical objects to the corresponding physical objects comprises pointing from the given logical objects to the given physical objects.

12. The method according to claim 1, and comprising adaptively re-allocating the physical resources during operation of the grid computer system.

13. The method according to claim 12, wherein adaptively re-allocating the physical resources comprises detecting a configuration change in the grid computer system, and re-allocating the physical resources so as to continue carrying out the functionalities of the logical system components following the configuration change.

14. The method according to claim 12, wherein specifying the data processing system comprises specifying a performance level of at least one of the logical system components, and wherein adaptively re-allocating the physical resources comprises detecting a deviation from the specified performance level and re-allocating the physical resources so as to correct the deviation.

15. The method according to claim 12, wherein adaptively re-allocating the physical resources comprises accepting a modification of the logical system definition and re-allocating the physical resources responsively to the modified logical system definition.

16. The method according to claim 1, wherein specifying the data processing system comprises defining two or more alternative logical system definitions, wherein mapping the logical objects to the physical objects comprises determining two or more alternative allocations of the physical resources corresponding to the respective logical system definitions, and wherein configuring and activating the physical resources comprises alternating between the two or more alternative allocations.

17. The method according to claim 16, wherein alternating between the two or more alternative allocations comprises alternating between the allocations in accordance with a predefined time schedule.

18. The method according to claim 1, and comprising evaluating an equivalent status of a logical system component by detecting a resource status of the physical resources that are allocated to carry out the functionality of the logical system component, and converting the resource status to the equivalent status of the logical system component.

19. The method according to claim 18, wherein evaluating the equivalent status comprises performing at least one action selected from a group of actions consisting of declaring a virtual failure in the logical system component, detecting a deviation from a performance level specified for the logical system component, reporting the equivalent status to a user and reporting the equivalent status to an external application.

20. The method according to claim 1, wherein specifying the data processing system comprises accepting the logical system definition from one of a user and an external application.

21. A computing apparatus, comprising:
   an interface, which is operative to communicate with a grid computer system that includes one or more physical ports and includes grid servers comprising both physical and virtual servers; and
   a processor, which is arranged to accept a specification of a data processing system using a logical system definition, which defines logical system components having respective functionalities and a topology for interconnecting the logical system components, wherein the logical system components comprise one or more logical ports, and wherein the logical system definition defines a logical server for carrying out a data processing task, to represent the logical system components using respective logical objects in a hierarchical object model, including given logical objects that represent the logical ports and the logical server, to represent physical resources of the grid computer system using physical objects in the hierarchical object model, including given physical objects that represent the physical ports, to automatically map the logical objects to at least some of the physical objects, including mapping the given logical objects to the given physical objects, so as to allocate the physical resources to carry out the respective functionalities of the logical system components, wherein a plurality of the grid servers, including at least one virtual server, are assigned to the logical server, and to configure and activate the allocated physical resources so as to cause the grid computer system to function as the data processing system, in accordance with the logical system definition.

22. The apparatus according to claim 21, wherein the logical system components comprise at least one component selected from a group of components consisting of logical servers, logical storage devices and logical networks.

23. The apparatus according to claim 21, wherein the logical objects comprise hierarchical objects comprising at least one class selected from a group of classes consisting of a root class, an environment class, a users class, a logical server class, a compute node class, a system class, and image class, an attribute class, a service class, an interface class and a logical disk class.

24. The apparatus according to claim 21, wherein the logical system definition comprises a specification of a service running on one or more of the logical system components, and wherein the processor is arranged to configure and activate the service on the allocated physical resources.

25. The apparatus according to claim 21, wherein the physical resources comprise at least one component selected from a group of components consisting of physical storage devices, virtual storage devices and communication networks.

26. The apparatus according to claim 21, wherein the physical objects comprise hierarchical objects comprising at least one class selected from a group of classes consisting of a root class, a site class, a users class, a system group class, a system class, an attribute class, a module class, an extent class and a port class.

27. The apparatus according to claim 24, wherein the system class comprises at least one subclass selected from a group of subclasses consisting of a field replaceable unit (FRU) subclass, a group subclass, a switch/router subclass, a computer subclass and a storage device subclass.

28. The apparatus according to claim 21, wherein the processor is arranged to automatically identify the physical resources in the grid computer system and to learn attributes of the identified physical resources.

29. The apparatus according to claim 21, wherein the processor is arranged to arrange the logical and physical objects in multiple levels of hierarchy in the object model, and to automatically map the logical objects to the physical objects by pointing from the logical objects to the corresponding physical objects at the multiple levels of the hierarchy.

30. The apparatus according to claim 29, wherein the processor is arranged to point from the given logical objects to the given physical objects.

31. The apparatus according to claim 21, wherein the processor is arranged to adaptively re-allocate the physical resources during operation of the grid computer system.

32. The apparatus according to claim 31, wherein the processor is arranged to detect a configuration change in the grid computer system, and to re-allocate the physical resources so as to continue carrying out the functionalities of the logical system components following the configuration change.

33. The apparatus according to claim 31, wherein the logical system definition comprises a specification of a performance level of at least one of the logical system components, and wherein the processor is arranged to detect a deviation from the specified performance level and to re-allocate the physical resources so as to correct the deviation.

34. The apparatus according to claim 31, wherein the processor is arranged to accept a modification of the logical system definition and to re-allocate the physical resources responsively to the modified logical system definition.

35. The apparatus according to claim 21, wherein the processor is arranged to accept two or more alternative logical system definitions, to determine two or more alternative allocations of the physical resources corresponding to the respective logical system definitions, and to alternate between the two or more alternative allocations.

36. The apparatus according to claim 35, wherein the processor is arranged to alternate between the allocations in accordance with a predefined time schedule.

37. The apparatus according to claim 21, wherein the processor is arranged to evaluate an equivalent status of a logical system component by detecting a resource status of the physical resources that are allocated to carry out the functionality of the logical system component, and converting the resource status to the equivalent status of the logical system component.

38. The apparatus according to claim 37, wherein the processor is arranged to perform at least one action selected from a group of actions consisting of declaring a virtual failure in the logical system component, detecting a deviation from a performance level specified for the logical system component, reporting the equivalent status to a user and reporting the equivalent status to an external application.

39. The apparatus according to claim 21, wherein the processor is arranged to store the hierarchical object model in a relational database.

40. The apparatus according to claim 21, and comprising a user terminal, which is arranged to interact with a user so as to enable the user to construct and enter the logical system definition.

41. The apparatus according to claim 40, wherein the user terminal is arranged to interact with the user using at least one interface type selected from a group of types consisting of a graphical user interface (GUI) and a command line interface (CLI).

42. The apparatus according to claim 21, and comprising an application interface, which is connected to the processor and is arranged to accept the logical system definition from an external application.

43. A computing system, comprising:
 a grid computer system comprising physical resources, including one or more physical ports and includes grid servers comprising both physical and virtual servers; and
 an infrastructure management (IM) server, which is arranged to accept a specification of a data processing system using a logical system definition, which defines logical system components having respective functionalities and a topology for interconnecting the logical system components, wherein the logical system components comprise one or more logical ports, and wherein the logical system definition defines a logical server for carrying out a data processing task, to represent the logical system components using respective logical objects in a hierarchical object model, including given logical objects that represent the logical ports and the logical server, to represent the physical resources of the grid computer system using physical objects in the hierarchical object model, including given physical objects that represent the physical ports, to automatically map the logical objects to at least some of the physical objects, including mapping the given logical objects to the given physical objects, so as to allocate the physical resources to carry out the respective functionalities of the logical system components, wherein a plurality of the grid servers, including at least one virtual server, are assigned to the logical server, and to configure and activate the allocated physical resources so as to cause the grid computer system to function as the data processing system, in accordance with the logical system definition.

44. The system according to claim 43, wherein the communication network comprises a remote direct memory access (RDMA)-capable network.

45. The system according to claim 43, wherein the IM server is arranged to accept the logical system definition from an external application.

46. The system according to claim 43, wherein the logical system components comprise at least one component selected from a group of components consisting of logical servers, logical storage devices and logical networks.

47. The system according to claim 43, wherein the physical resources comprise at least one component selected from a group of components consisting of physical storage devices, virtual storage devices and communication networks.

48. The system according to claim 43, wherein the IM server is arranged to automatically identify the physical resources in the grid computer system and to learn attributes of the identified physical resources.

49. The system according to claim 43, wherein the IM server is arranged to adaptively re-allocate the physical resources during operation of the grid computer system.

50. The system according to claim 43, wherein the IM server is arranged to accept two or more alternative logical system definitions, to determine two or more alternative allocations of the physical resources corresponding to the respective logical system definitions, and to alternate between the two or more alternative allocations in accordance with a predetermined time schedule.

51. The system according to claim 43, wherein the IM server is arranged to evaluate a virtual status of a logical system component by detecting a resource status of the physical resources that are allocated to carry out the functionality of the logical system component, and converting the resource status to the virtual status of the logical system component.

52. A computer software product for controlling a grid computer system that includes one or more physical ports and includes grid servers including both physical and virtual servers, the product comprising a computer-readable medium, in which program instructions are stored, which instructions, when read by a computer, cause the computer to accept a specification of a data processing system using a logical system definition, which defines logical system components having respective functionalities and a topology for interconnecting the logical system components, wherein the logical system components comprise one or more logical ports, and wherein the logical system definition defines a logical server for carrying out a data processing task, to represent the logical system components using respective logical objects in a hierarchical object model, including given logical objects that represent the logical ports and the logical server, to represent physical resources of the grid computer system using physical objects in the hierarchical object model, including given physical objects that represent the physical ports, to automatically map the logical objects to at least some of the physical objects, including mapping the given logical objects to the given physical objects, so as to allocate the physical resources to carry out the respective functionalities of the logical system components, wherein a plurality of the grid servers, including at least one virtual server, are assigned to the logical server, and to configure and activate the allocated physical resources so as to cause the grid computer system to function as the data processing system, in accordance with the logical system definition.

53. The product according to claim 52, wherein the logical system components comprise at least one component selected from a group of components consisting of logical servers, logical storage devices and logical networks.

54. The product according to claim 52, wherein the logical objects comprise hierarchical objects comprising at least one class selected from a group of classes consisting of a root class, an environment class, a users class, a logical server class, a compute node class, a system class, an image class, an attribute class, a service class, an interface class and a logical disk class.

55. The product according to claim 52, wherein the logical system definition comprises a specification of a service running on one or more of the logical system components, and wherein the instructions cause the computer to configure and activate the service on the allocated physical resources.

56. The product according to claim 52, wherein the physical resources comprise at least one component selected from a group of components consisting of physical storage devices, virtual storage devices and communication networks.

57. The product according to claim 52, wherein the physical objects comprise hierarchical objects comprising at least one class selected from a group of classes consisting of a root class, a site class, a users class, a system group class, a system class, an attribute class, a module class, an extent class and a port class.

58. The product according to claim 57, wherein the system class comprises at least one subclass selected from a group of subclasses consisting of a field replaceable unit (FRU) subclass, a group subclass, a switch/router subclass, a computer subclass and a storage device subclass.

59. The product according to claim 52, wherein the instructions cause the computer to automatically identify the physical resources in the grid computer system and to learn attributes of the identified physical resources.

60. The product according to claim 52, wherein the instructions cause the computer to arrange the logical and physical objects in multiple levels of hierarchy in the object model, and to automatically map the logical objects to the physical objects by pointing from the logical objects to the corresponding physical objects at the multiple levels of the hierarchy.

61. The product according to claim 60, wherein the instructions cause the computer to point from the given logical objects to the given physical objects.

62. The product according to claim 52, wherein the instructions cause the computer to adaptively re-allocate the physical resources during operation of the grid computer system.

63. The product according to claim 62, wherein the instructions cause the computer to detect a configuration change in the grid computer system, and to re-allocate the physical resources so as to continue carrying out the functionalities of the logical system components following the configuration change.

64. The product according to claim 62, wherein the logical system definition comprises a specification of a performance level of at least one of the logical system components, and wherein the instructions cause the computer to detect a deviation from the specified performance level and to re-allocate the physical resources so as to correct the deviation.

65. The product according to claim 62, wherein the instructions cause the computer to accept a modification of the logical system definition and to re-allocate the physical resources responsively to the modified logical system definition.

66. The product according to claim 52, wherein the instructions cause the computer to accept two or more alternative logical system definitions, to determine two or more alternative allocations of the physical resources corresponding to the respective logical system definitions, and to alternate between the two or more alternative allocations.

67. The product according to claim 66, wherein the instructions cause the computer to alternate between the allocations in accordance with a predefined time schedule.

68. The product according to claim 52, wherein the instructions cause the computer to evaluate an equivalent status of a logical system component by detecting a resource status of the physical resources that are allocated to carry out the functionality of the logical system component, and converting the resource status to the equivalent status of the logical system component.

69. The product according to claim 68, wherein the instructions cause the computer to perform at least one action selected from a group of actions consisting of declaring a virtual failure in the logical system component, detecting a deviation from a performance level specified for the logical system component, reporting the equivalent status to a user and reporting the equivalent status to an external application.

70. The product according to claim 52, wherein the instructions cause the computer to store the hierarchical object model in a relational database.

71. The product according to claim 52, wherein the instructions cause the computer to interact with a user so as to enable the user to construct and enter the logical system definition.

72. The product according to claim 71, wherein the instructions cause the computer to interact with the user using at least one interface type selected from a group of types consisting of a graphical user interface (GUI) and a command line interface (CLI).

73. The product according to claim 52, wherein the instructions cause the computer to accept the logical system definition from an external application.

74. The method according to claim 1, wherein mapping the given logical objects to the given physical objects comprises mapping a single logical port to a plurality of the physical ports.

75. The method according to claim 1, wherein mapping the given logical objects to the given physical objects comprises mapping a plurality of the logical ports to a single physical port.

76. The apparatus according to claim 21, wherein the processor is arranged to map the given logical objects to the given physical objects by mapping a single logical port to a plurality of the physical ports.

77. The apparatus according to claim 21, wherein the processor is arranged to map the given logical objects to the given physical objects by mapping a plurality of the logical ports to a single physical port.

78. The system according to claim 43, wherein the IM server is arranged to map the given logical objects to the given physical objects by mapping a single logical port to a plurality of the physical ports.

79. The system according to claim 43, wherein the IM server is arranged to map the given logical objects to the given physical objects by mapping a plurality of the logical ports to a single physical port.

80. The product according to claim 52, wherein the instructions cause the computer to map the given logical objects to the given physical objects by mapping a single logical port to a plurality of the physical ports.

81. The product according to claim 52, wherein the instructions cause the computer to map the given logical objects to the given physical objects by mapping a plurality of the logical ports to a single physical port.

* * * * *